United States Patent
Kawasaki et al.

[11] Patent Number: 5,843,243
[45] Date of Patent: Dec. 1, 1998

[54] WEAR-RESISTANT COPPER-BASED ALLOY

[75] Inventors: Minoru Kawasaki, Aichi; Noboru Takayanagi, Gifu; Hiromi Nomura, Aichi; Akio Sato, Aichi; Isaka Kanazawa, Aichi; Kensuke Hidaka; Shozo Nagai, both of Kyoto, all of Japan

[73] Assignees: Toyota Jidosha Kabushiki Kaisha, Toyota; Fukuda Metal Foil & Powder Co., Ltd., Kyoto, both of Japan

[21] Appl. No.: 601,582

[22] Filed: Feb. 14, 1996

[30] Foreign Application Priority Data

Feb. 17, 1995 [JP] Japan .................................. 7-053262

[51] Int. Cl.$^6$ ........................................ C22C 9/06
[52] U.S. Cl. ..................... 148/435; 420/487; 420/587
[58] Field of Search ........................... 420/487, 587; 428/674; 148/435

[56] References Cited

U.S. PATENT DOCUMENTS

| | | | |
|---|---|---|---|
| 4,818,307 | 4/1989 | Mori et al. | 148/414 |
| 5,188,799 | 2/1993 | Mori et al. | 420/469 |

FOREIGN PATENT DOCUMENTS

0505172 A1  9/1992  European Pat. Off. .
61-64838   4/1986  Japan .
3-087327   4/1991  Japan .
4-131341   5/1992  Japan .
4-297536  10/1992  Japan .
7-90437    4/1995  Japan .

OTHER PUBLICATIONS

"Development of Valve Seat Alloys for Laser Cladding," by K. Tanaka et al., Toyota Chuo Kenkyusho R & D Rebyu, vol. 28, No. 3 (1993), PP. 35–45.

*Primary Examiner*—Sikyin Ip
*Attorney, Agent, or Firm*—Burns, Doane, Swecker & Mathis, LLP

[57] ABSTRACT

A wear-resistant copper-based alloy includes 10.0 to 30.0% by weight Ni, 2.0 to 15.0% by weight Fe, 2.0 to 15.0% by weight Co, 0.5 to 5.0% by weight Si, 1.0 to 10.0% by weight Cr, 2.0 to 15.0% by weight at least one first optional element selected from the group consisting of Mo, Ti, Zr, Nb and V, at least one second optional element selected from the group consisting of C and O, and the balance of Cu and inevitable impurities. A carbon content "X" and an oxygen content "Y" satisfy the following relationships; namely: $0 \leq \text{"X"} \leq 0.5$, $0 \leq \text{"Y"} \leq 0.05$, and $\text{"Y"} \geq (-0.8)(\text{"X"}) + 0.04$. The wear-resistant copper-based alloy enables to improve the toughness of weld bead, and to inhibit weld bead from cracking effectively in the solidifying process of a building-up operation.

28 Claims, 20 Drawing Sheets

C(X) : 0.05wt%

C(X) : 0.05wt%
Cu

C(X) : 0.05wt%
Si

C(X) : 0.05wt%
C

C(X) : 0.5wt%

C(X) : 0.5wt%
Cu

C(X) : 0.5Wt% Si

C(X) : 0.5Wt% C

C(X) : 0.7wt%

C(X) : 0.7wt%
Cu

C(X) : 0.7wt% Ni

C(X) : 0.7wt% Mo

C(X) : 0.7wt%
Si

C(X) : 0.7wt%
C 0.0006% C 0.01% C 0.03% C 0.05% C

WEAR-RESISTANT COPPER-BASED ALLOY

BACKGROUND OF THE INVENTION

1. Field of the Invention

The present invention relates to a wear-resistant copper-based alloy. A wear-resistant copper-based alloy according to the present invention is applicable to improving the surface of an aluminum-based substrate in terms of wear-resistance by building-up. For example, the present wear-resistant copper-based alloy per se can be built-up on the surface of an aluminum-based substrate by means of high-density energy, such as laser, plasma, acetylene gas, and TIG (tungsten-inert gas) welding.

2. Description of Related Art

There have been available a variety of surface-treatment techniques for enhancing the wear-resistance, heat-resistance, and corrosion resistance of an aluminum-based substrate. One of the surface-treatment techniques is to build-up a material, which is good in terms of the physical properties, on the surface of an aluminum-based substrate.

For example, Japanese Unexamined Patent Publication (KOKAI) No. 4-297,536 discloses a technique, in which a copper-based alloy of good heat-resistance, wear-resistance and corrosion-resistance is built-up on the surface of an aluminum-based substrate by means of high-density energy (e.g., by irradiating a laser beam). The copper-based alloy, used in the building-up technique, consists essentially of Ni in an amount of from 10.0 to 30.0% by weight, Fe in an amount of from 2.0 to 15.0% by weight, Cr in an amount of from 1.0 to 10.0% by weight, Si in an amount of from 0.5 to 5.0% by weight, Co in an amount of from 2.0 to 15.0% by weight, at least one element selected from the group consisting of Mo, W, Nb and V in an amount of from 2.0 to 15.0% by weight, and the balance of Cu and inevitable impurities.

The copper-based alloy has a metallic structure, in which hard phases are dispersed in an α-phase. The hard phases contain hard particles of silicide, which include at least one element selected from the group consisting of Mo, W, Nb and V. For instance, the silicide can be molybdenum, wolfram, niobium or vanadium silicide. The α-phase includes Cu-Ni alloy. The silicide hard particles exhibit a hardness of from 1,200 to 1,300 in Hv, and strengthens the α-phase made of Cu-Ni alloy. Thus, the silicide hard particles contribute to enhancing the wear-resistance of the copper-based alloy. Moreover, the silicide hard particles are likely to decompose at a temperature of about 500° C. or more even under a low-oxygen-partial-pressure condition, and are likely to produce oxide (e.g., molybdenum, wolfram, niobium or vanadium oxide). The oxide has a low melting point so that it melts during sliding operation. Accordingly, the molten oxide covers the surface of the copper-based alloy, and prevents the α-phase matrix from contacting with a mating member. As a result, the copper-based alloy exhibits a high self-lubricating characteristic during sliding operation. Thus, the copper-based alloy can have improved wear-resistance and cohesion-resistance.

However, when the conventional copper-based alloy is built-up on the surface of an aluminum-based substrate by a laser beam, the resulting built-up layer (i.e., weld bead) is likely to crack finely. The weld bead cracks, because the conventional copper-based alloy exhibits lower fracture strength than residual tensile stress (or solidification-shrinkage stress) when it solidifies in the building-up operation. In the building-up operation, especially in the course of solidifying, it is possible to inhibit the weld bead from cracking to some extent by relieving the solidification-shrinkage stress. However, such a countermeasure has not been done to the conventional copper-based alloy at all.

SUMMARY OF THE INVENTION

The present invention has been developed in view of the circumstances described above. It is therefore an object of the present invention to provide a wear-resistant copper-based alloy of high toughness, thereby enabling to effectively inhibit the resulting weld bead from cracking in the building-up operation, especially in the course of solidifying.

A first embodiment of a wear-resistant copper-based alloy according to the present invention can solve the aforementioned problem of the conventional copper-based alloy, and comprises:

- nickel (Ni) in an amount of from 10.0 to 30.0% by weight;
- iron (Fe) in an amount of from 2.0 to 15.0% by weight;
- cobalt (Co) in an amount of from 2.0 to 15.0% by weight;
- silicon (Si) in an amount of from 0.5 to 5.0% by weight;
- chromium (Cr) in an amount of from 1.0 to 10.0% by weight;
- at least one first optional element selected from the group consisting of molybdenum (Mo), titanium (Ti), zirconium (Zr), niobium (Nb) and vanadium (V) in an amount of from 2.0 to 15.0% by weight;
- at least one second optional element selected from the group consisting of carbon (C) and oxygen (O); and
- the balance of copper (Cu) and inevitable impurities;
- wherein a content of the C, designated by "X"% by weight, and a content of the O, designated by "Y"% by weight, satisfy the following relationships (1) through (3):

(1): $0 \leq \text{"X"} \leq 0.5$;

(2): $0 \leq \text{"Y"} \leq 0.05$; and (3): $\text{"Y"} \geq (-0.8)(\text{"X"}) + 0.04$.

The first embodiment of the present wear-resistant copper-based alloy includes C and/or O in the controlled amounts. The actions of C and/or O can effectively inhibit the resulting welding bead from cracking in the building-up operation.

Cu-Ni-based alloys, in which Co, Mo, Ti, Zr, Nb or V is added together with Si, have a metallic structure in which hard phases are dispersed in an α-phase matrix. The hard phases include silicide (e.g., cobalt, molybdenum, titanium, zirconium, niobium or vanadium silicide). The α-phase matrix includes Cu-Ni-based alloys. The silicide and the α-phase matrix do not mix each other in liquid phase, and accordingly are separated in two liquid phases. The silicide has a larger specific gravity than that of the α-phase matrix. For example, $MoSi_2$ has a specific gravity of 9.2, and $WSi_2$ has a specific gravity of 19.3. Whereas, the α-phase matrix has a specific gravity of 8.9. Consequently, in the liquid phase, the silicide agglomerates below the α-phase matrix because of the specific gravity difference.

However, when C is added to the Cu-Ni-based alloys, there arises cobalt, molybdenum, titanium, zirconium, niobium or vanadium carbide of low specific gravity. For example, the arising carbide is $Mo_2C$, and has a specific gravity of from 8.2 to 8.9. The carbide becomes nuclei which grow into the hard phases. Moreover, the cobalt, molybdenum, titanium, zirconium, niobium or vanadium silicide precipitates around the carbide so as to produce a high-melting-point composite compound. Accordingly, the silicide is dispersed uniformly so that the silicide is inhibited from agglomerating in the liquid phase. As a result, the first embodiment of the present wear-resistant copper-based alloy has a metallic structure, in which the hard phases, made from the high-melting-point composite compound, are dispersed evenly and finely in the α-phase matrix, made from the Cu-Ni-based alloys. Hence, the first embodiment has improved toughness, and enables to effectively inhibit the resulting weld bead from cracking in the building-up operation.

In the first embodiment, when C is present in an amount of less than 0.05% by weight (i.e., "X"<0.05), the composite compound, which includes the carbide nuclei and the silicide deposited around the carbide nuclei, inhibits the resulting weld bead from cracking inadequately. Accordingly, it is preferred that C is present in an amount of 0.05% by weight or more (i.e., "X"≧0.05). Note that, when C is present in an amount of 0.05% by weight or more, and even when no O is present (i.e., "Y"=0), the carbide nuclei enable to inhibit the resulting weld bead from cracking adequately. When C is present in an amount of more than 0.5% by weight (i.e., "X">0.5), the carbide nuclei keep inhibiting the silicide from segregating, but free carbon precipitates in the resulting weld bead to weaken the toughness. Consequently, it is preferred that C is present in an amount of 0.5% by weight or less (i.e., "X"≦0.5). It is further preferred that C is present in an amount of from 0.05 to 0.4% by weight (i.e., 0.05≦"X"≦0.4).

Further, in the first embodiment, when O is present, an $SiO_2$ protective layer can be formed on the surface of the resulting built-up layer. The $SiO_2$ protective layer effects annealing during solidification. Thus, it is possible to relieve the stress that results from shrinkage during solidification, and to effectively inhibit the resulting weld bead from cracking in the building-up operation.

In the first embodiment, when O is present in a very small amount, the $SiO_2$ protective layer inhibits the resulting weld bead from cracking insufficiently. Note that, when O is present in an amount of 0.04% by weight or more (i.e., "Y"≧0.04), and even when no C is present (i.e., "X"=0), the $SiO_2$ protective layer enables to inhibit the resulting weld bead from cracking sufficiently. Accordingly, it is preferred that O is present in an amount of 0.04% by weight or more (i.e., "Y"≧0.04). When O is present in a very large amount, the temperature of the molten layer increases abruptly. As a result, the aluminum-based substrate melts excessively, is diluted extraordinarily, and generates hydrogen gas to produce a large number of pin holes (gas defects) in the resulting built-up layer in the building-up operation. Additionally, O itself resides in the built-up layer to produce gas defects. Consequently, it is preferred that O is present in an amount of 0.05% by weight or less (i.e., "Y"≦0.05). It is further preferred that O is present in an amount of from 0.03 to 0.05% by weight (i.e., 0.03≦"Y"≦0.05).

Furthermore, in the first embodiment, when C is present in an amount of less than 0.05% by weight (i.e., 0<"X"<0.05), and when O is adjusted so as to be present in an amount satisfying the following relationship (3) (i.e., "Y"≧(−0.8)("X")+0.04), it is possible to inhibit the resulting welding bead from cracking properly. This advantage results from the fact that independent C or O inhibits the resulting weld bead from cracking less, but C and O synergetically inhibit the resulting weld bead from cracking effectively.

A second embodiment of a wear-resistant copper-based alloy according to the present invention can solve the aforementioned problem of the conventional copper-based alloy, and comprises:

nickel (Ni) in an amount of from 10.0 to 30.0% by weight;
iron (Fe) in an amount of from 2.0 to 15.0% by weight;
cobalt (Co) in an amount of from 2.0 to 15.0% by weight;
silicon (Si) in an amount of from 0.5 to 5.0% by weight;
chromium (Cr) in an amount of from 1.0 to 10.0% by weight;
at least one first optional element selected from the group consisting of molybdenum (Mo), titanium (Ti), zirconium (Zr), niobium (Nb) and vanadium (V) in an amount of from 2.0 to 15.0% by weight;
at least one second optional element selected from the group consisting of carbon (C) and oxygen (O); and
the balance of copper (Cu) and inevitable impurities;
wherein a content of the C, designated by "X"% by weight, and a content of the O, designated by "Y"% by weight, satisfy the following relationships (1), (2) and (4):

(1): 0≦"X"≦0.5;
(2): 0≦"Y"≦0.05; and
(3): "Y"≧(−0.6)("X")+0.03; and
lead (Pb), one of the inevitable impurities, being present in an amount of 0.02% by weight or less.

The second embodiment of the present wear-resistant copper-based alloy includes C and/or O in the controlled amounts. In addition, Pb is present as an inevitable impurity in the suppressed amount of 0.02% by weight or less. Hence, in addition to the advantages effected by the first embodiment, the second embodiment produces the following extra advantages, which primarily result from the suppressed amount of Pb as one of the inevitable impurities.

The resulting built-up layer cracks because it has poor strength, or it is subjected to excessive shrinkage stress during solidification. The shrinkage stress depends on the temperature variation in the transformation of the built-up layer from liquid phase to solid phase during solidification. Pb is a low melting-point metal, and is insoluble to most of the other constituent elements of the present wear-resistant copper-based alloy. For example, the first phase of the primary crystal of the present wear-resistant copper-based alloy has a melting point of about 1,400° C. Whereas, Pb has a melting point of 327° C. Accordingly, Pb remains as a liquid phase even in the final stage of solidification in the building-up operation, the temperature difference between the liquid phase and the solid phase remains as high as about 1,000° C. In short, it takes a long period of time for Pb to solidify completely. As a result, large shrinkage stress is likely to occur, and cracks are liable to develop beginning at completely-solidifying Pb. Hence, in the second embodiment, Pb, which adversely affects the cracking-resistance of the resulting build-up layer, is present in the suppressed amount of 0.02% by weight or less. Therefore, the second embodiment enables to effectively inhibit the resulting weld bead from cracking in the building-up operation.

In the second embodiment, in which Pb, one of the inevitable impurities, is present in the suppressed amount of 0.02% by weight or less, it is possible to enlarge the content range of C and/or O, for instance, to decrease the lower content thereof, compared with that of the first embodiment. Thus, the second embodiment still effects to inhibit the resulting weld bead from cracking sufficiently.

In the second embodiment, when C is present in an amount of less than 0.05% by weight (i.e., 0<"X"<0.05), and when O is adjusted so as to be present in an amount (i.e., "Y") satisfying the following relationship (4) (i.e., "Y"≧(−

0.6)("X")+0.03), it is possible to inhibit the resulting welding bead from cracking adequately.

Note that, similarly to the first embodiment, when C is present in an amount of 0.05% by weight or more (i.e. "X"≧0.05), and even when no O is present (i.e., "Y"=0), the second embodiment inhibits the resulting weld bead from cracking properly. Consequently, it is preferred that C is present in an amount of 0.05% by weight or more (i.e., "X"≧0.05).

In the second embodiment, note that when O is present in an amount of 0.03% by weight or more, and even when no C is present (i.e., "X"=0), the second embodiment inhibits the resulting weld bead from cracking sufficiently. Accordingly, it is preferred that O is present in an amount of 0.03% by weight or more (i.e., "Y"≧0.03). Note that, due to the similar reasoning set forth in the first embodiment, the upper limit of the C and/or O content was adjusted to be 0.5% by weight (i.e., "X"≦0.5), and 0.05% by weight (i.e., "Y"≦0.05), respectively.

Likewise, in the second embodiment, it is further preferred that C is present in an amount of from 0.05 to 0.4% by weight (i.e., 0.05≦"X"≦0.4), and that O is present in an amount of from 0.03 to 0.05% by weight (i.e., 0.03≦"Y"≦0.05).

Thus, the first and second embodiments can inhibit the silicides from agglomerating in their molten states because the fine composite compounds are dispersed evenly therein. Accordingly, the first and second embodiments provide the following extra advantages when they are made into powders or rods from their molten states.

When the silicides agglomerate in a preparation of powders, for instance, by a gas atomizing process, the agglomerated silicides stuck to a nozzle of a tundish. As a result, the material loss is adversely affected in the melting operation, or the compositions of the resulting powders vary greatly. On the contrary, the first and second embodiments are free from these problems. Even when the first and second embodiments are made into rods from their molten states, the compositions of the resulting rods vary less.

In accordance with the present invention, C and/or O are present in the specified amounts in the first and second embodiments of the present wear-resistant copper-based alloy. Hence, the first and second embodiments enable to inhibit the resulting weld bead from cracking in the building-up operation effectively. They can be applied to a mass-production of aluminum-based cylinder heads. For example, they can be used to build-up valve seats of mass-produced aluminum-based cylinder heads. Further, they can improve the productivity of their powders from their molten states, and can suppress the fluctuation in the compositions of the resulting powders. Furthermore, they enable to reduce production cost when they are made into powders and rods from their molten states.

Hereinafter, the other constituent elements of the present wear-resistant copper-based alloy, and how their compositions were determined will be described.

Nickel (Ni): part of Ni dissolves in Cu to form a Cu-Ni phase (i.e., the matrix of the present wear-resistant copper-based alloy), the other part thereof forms nickel silicides to strengthen the matrix. Moreover, Ni is needed to include Co, Mo, Ti, Zr, Nb, V, Cr or Fe, which is an element for upgrading wear-resistance, in the present wear-resistant copper-based alloy. When Ni is added in an amount of less than 10.0% by weight, the resulting copper-based alloy does not exhibit properties, such as corrosion-resistance and wear-resistance which are comparable with those of conventional Cu-Ni-based alloy, and contains Co, Mo, Ti, Zr, Nb, V, Cr or Fe in a decreased amount only. When Ni is added in an increased amount, the resulting copper-based alloy is likely to melt, but includes phases in which Cu dissolves in a decreased amount. Thus, the resulting copper-based alloy loses the inherent properties of copper-based alloy, such as high heat conductivity and comformability with mating member. Consequently, the upper content of Ni is adjusted to be 30.0% or less. Thus, the present wear-resistant copper-based alloy includes Ni in an amount of from 10.0 to 30.0% by weight, preferably in an amount of from 12.0 to 25.0% by weight.

Iron (Fe): Fe operates similarly to Ni and Co in terms of the solubility of the present wear-resistant copper-based alloy, and accordingly can substitute for part of Ni and Co. When Fe substitutes for part of Ni and Co, it is possible to employ ferromolybdenum as a source of a raw molten material for Mo, Ti, Zr, Nb or V. As a result, it is possible to obtain an economic advantage, the reduction in production cost. In view of the Fe content of ferromolybdenum and the content of Mo, Ti, Zr, Nb or V of the present wear-resistant copper-based alloy, the present wear-resistant copper-based alloy includes Fe in an amount of from 2.0 to 15.0% by weight, preferably in an amount of from 3.0 to 10.0% by weight.

Cobalt (Co): Co hardly dissolves in Cu. However, Co is alloyed with part of Ni to form the high-melting-point composite compounds together with Si, Ti, Zr, Nb, V, Cr or C, thereby enhancing the wear-resistance of the present wear-resistant copper-based alloy. When Co is added in an amount of less than 2.0% by weight, the high-melting-point composite compounds are produced in an insufficient amount to degrade the wear-resistance of the resulting copper-based alloy. When Co is added in an amount of more than 15.0% by weight, the high-melting-point composite compounds are produced in an excessive amount to deteriorate the toughness of the resulting copper-based alloy. Moreover, if such is the case, the resulting copper-based alloy cannot be processed into powders with ease because it exhibits a liquidus curve at elevated temperatures in the phase diagram. Thus, the present wear-resistant copper-based alloy includes Co in an amount of from 2.0 to 15.0% by weight, preferably in an amount of from 2.0 to 10.0% by weight.

Silicon (Si): Si reacts with Ni to form nickel silicide to strengthen the matrix of the present wear-resistant copper-based alloy. Moreover, Si reacts with Co, Mo, Ti, Zr, Nb, V, Cr or C, which is an element for upgrading wear-resistance, to produce the high-melting-point composite compounds, thereby enhancing the wear resistance of the present wear-resistant copper-based alloy. When Si is added in an amount of less than 0.5% by weight, the high-melting-point composite compounds are produced in an insufficient amount to degrade the wear-resistance of the resulting copper-based alloy. When Si is added in an amount of more than 5.0% by weight, the nickel silicides and the high-melting-point composite compounds are produced in excessive amounts to deteriorate the toughness of the resulting copper-based alloy. Thus, the present wear-resistant copper-based alloy includes Si in an amount of from 0.5 to 5.0% by weight, preferably in an amount of from 0.5 to 3.5% by weight.

Chromium (Cr): Cr hardly dissolves in Cu. However, Cr is alloyed with part of Ni and/or Co to improve the oxidation-resistance of the present wear-resistant copper-based alloy. Further, Cr forms the high-melting-point composite compounds together with Si, Co, Mo, Ti, Zr, Nb, V or C, thereby enhancing the wear-resistance of the present wear-resistant copper-based alloy. Furthermore, when the building-up operation is carried out with a powder by means of laser, Cr bonds with O to form a stable oxide film, and upgrades the weldability in the powder-building-up by means of laser. When Cr is added in an amount of less than 1.0% by weight, the high-melting-point composite compounds are produced in an insufficient amount to degrade the wear-resistance of the resulting copper-based alloy. When Cr is added in an amount of more than 10.0% by weight, the high-melting-point composite compounds are produced in an excessive amount to deteriorate the toughness of the resulting copper-based alloy. Moreover, if such is the case, the resulting copper-based alloy cannot be processed into powders with ease because it exhibits a liquidus curve at elevated temperatures in the phase diagram. Thus, the present wear-resistant copper-based alloy includes Cr in an amount of from 1.0 to 10.0% by weight, preferably in an amount of from 1.0 to 5.0% by weight.

Molybdenum (Mo), Titanium (Ti), Zirconium (Zr), Niobium (Nb) or Vanadium (V): Mo, Ti, Zr, Nb or V does not dissolve in Cu, but is alloyed with Co and/or part of Ni to improve the heat resistance of the present wear-resistant copper-based alloy. Moreover, Mo, Ti, Zr, Nb or V reacts with Si, Co, Cr or C to produce the high-melting-point composite compounds, thereby enhancing the wear-resistant of the present wear-resistant copper-based alloy. When the first optional element, which is at least one element selected from the group consisting of Mo, Ti, Zr, Nb and V, is added in an amount of less than 2.0% by weight, the high-melting-point composite compounds are produced in an insufficient amount to degrade the wear-resistance of the resulting copper-based alloy. When the first optional element is added in an amount of more than 15.0% by weight, the high-melting-point composite compounds are produced in an excessive amount to deteriorate the toughness of the resulting copper-based alloy. Moreover, if such is the case, the resulting copper-based alloy cannot be processed into powders with ease because it exhibits a liquidus curve at elevated temperatures in the phase diagram. Thus, the present wear-resistant copper-based alloy includes at least one first optional element, which is selected from the group consisting of Mo, Ti, Zr, Nb and V, in an amount of from 2.0 to 15.0% by weight, preferably in an amount of from 2.0 to 10.0% by weight.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
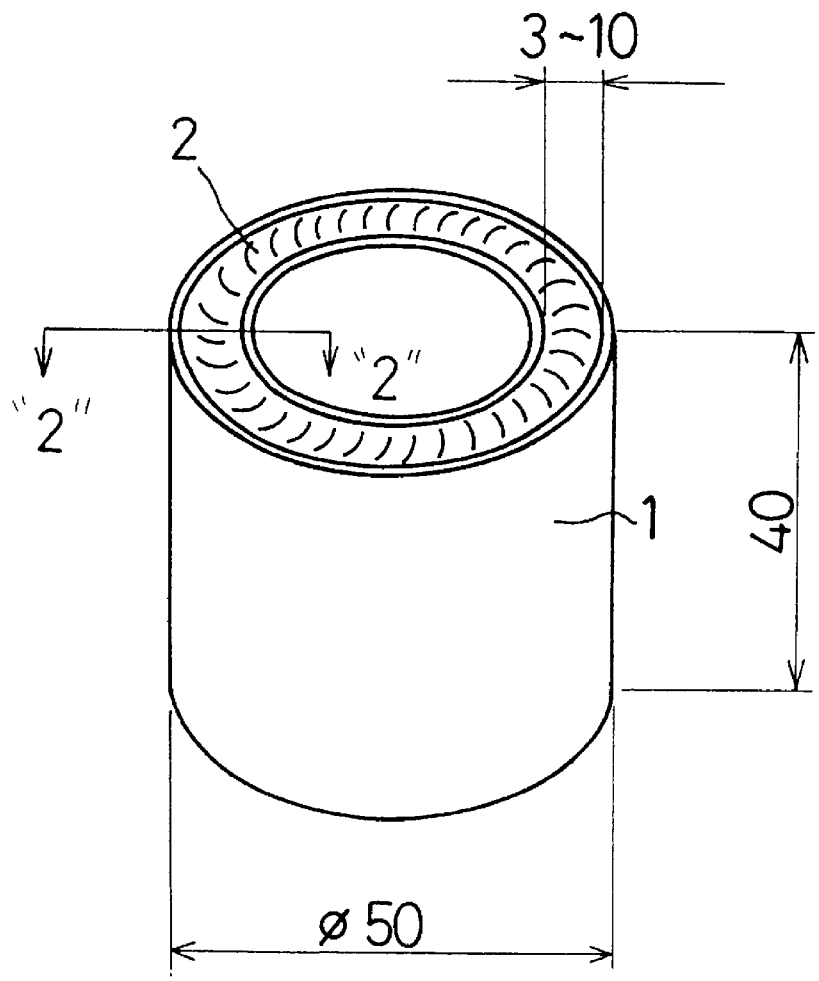
FIG. 1 is a perspective view of a test specimen which was used to evaluate preferred embodiments of a wear-resistant copper-based alloy according to the present invention.

Having generally described the present invention, a further understanding can be obtained by reference to the specific preferred embodiments which are provided herein for the purpose of illustration only and not intended to limit the scope of the appended claims.

First Preferred Embodiment

Wear-resistant copper-based alloy powders, which had compositions as recited in Table 1 below, were produced by a gas atomizing process. Note that the resulting powders had a grain size of from 80 to 350 meshes. In the gas atomizing process, the powders of the raw alloying elements were heated at 1,700° C. in an oven to prepare about 100 kg of molten metal for each of the copper-based alloy powders. The molten metal was charged in a container (i.e., a tundish) with a nozzle provided at the bottom. Then, the molten metal was discharged through the nozzle. An $N_2$ gas was sprayed onto the discharged molten metal to pulverize the molten metal. The pulverized molten metal was kept in the $N_2$ atmosphere to cool. The copper-based alloy powders set forth in Table 1 were thus prepared.

In the copper-based alloy powders, the content of O could be controlled by adjusting the oxygen concentration in the atomizing chamber. Note that, however, the contents of the inevitable impurities, such as Pb, Al, P, S, Sn, Zn, Bi, Sb, Mg, and so on, were not controlled. Accordingly, in the copper-based alloy powders, it is believed that Pb was present as an inevitable impurity in an amount of about 0.03% by weight, and that the other inevitable impurities, such as Al, P, S, Sn, Zn, Bi, Sb, Mg, and so on, were present in a total amount of 0.5% by weight.

TABLE 1

| Identification | | Alloy Composition (% by Weight) | | | | | | | | | | | | | |
|---|---|---|---|---|---|---|---|---|---|---|---|---|---|---|---|
| | | Ni | Si | Co | Mo | Cr | Fe | [O] | Al | Y | Misch | Ti | Zr | Hf | C | Cu |
| 1st pref. Embodiment | No. 1 | 14.5 | 2.2 | 6.5 | 5.0 | 1.2 | 3.0 | 0.02 | — | — | — | — | — | — | 0.06 | balance |
| " | No. 2 | 16.0 | 3.0 | 7.5 | 6.5 | 1.5 | 5.0 | 0.05 | — | — | — | — | — | — | 0.15 | balance |
| " | No. 3 | 18.0 | 3.5 | 9.0 | 7.5 | 1.8 | 6.5 | 0.05 | — | — | — | — | — | — | 0.45 | balance |
| " | No. 4 | 15.5 | 2.7 | 7.0 | 5.5 | 1.5 | 5.5 | 0.08 | 0.04 | 0.01 | 0.01 | 0.01 | 0.01 | 0.01 | 0.13 | balance |
| " | No. 5 | 15.8 | 2.9 | 7.6 | 6.5 | 1.6 | 5.9 | 0.04 | 0.05 | — | — | — | — | — | 0.10 | balance |
| " | No. 6 | 16.0 | 3.0 | 8.0 | 6.8 | 1.8 | 5.5 | 0.05 | — | 0.05 | — | 0.03 | — | — | 0.08 | balance |
| Comparative Ex. | No. 7 | 16.2 | 2.9 | 7.8 | 6.5 | 1.5 | 5.2 | 0.03 | 0.02 | — | — | — | — | — | 0.006 | balance |
| " | No. 8 | 16.1 | 2.8 | 7.7 | 6.7 | 1.3 | 5.0 | 0.04 | 0.02 | — | 0.03 | — | — | — | 0.6 | balance |

| | Powder Producibility | | Toughness |
|---|---|---|---|
| | Segregation | Closed Nozzle | Impact Value |
| | none | none | 1.0 |
| | none | none | 2.1 |
| | none | none | 1.0 |
| | none | none | 2.5 |
| | none | none | 2.0 |

TABLE 1-continued

| | | |
|---|---|---|
| none | none | 1.9 |
| occurred | 5 times or more | 0.6 |
| none | none | 0.15 |

Evaluation on Powder Producibility

The copper-based alloy powders of the First Preferred Embodiment according to the present invention and those of Comparative Examples were examined for powder producibility. In this evaluation, the nozzle of the tundish was checked whether it was closed by the approximately 100 kg molten metal during the powder preparation by the atomizing process. Moreover, the resulting alloy powders were cast into ingots by solidifying at a rate; namely: they were cooled from 1,500° C. to about 15° C. in a minute. The thus prepared ingots were cut, and their cross-sections were observed visually whether segregation occurred therein. The results of this evaluation are also summarized in Table 1.

It is understood from Table 1 that copper-based alloy powder Nos. 1 through 6 of the First Preferred Embodiment did not close the nozzle, and that no segregation occurred in the ingots which were made from copper-based alloy powder Nos. 1 through 6.

On the other hand, comparative copper-based alloy powder No. 7 whose carbon content was too small closed the nozzle, and segregation occurred in the ingots which were made from comparative copper-based alloy powder No. 7. Thus, in copper-based alloy powder No. 7, such a small carbon content could not prevent the segregation, and silicides of Mo, etc., agglomerated.

Evaluation on Toughness

The copper-based alloy powders of the First Preferred Embodiment according to the present invention and those of Comparative Examples were also examined for toughness. In this evaluation, the molten metal of each of the copper-based alloy powders was collected and charged into a shell mold to cast rectangular parallelepiped test specimens. The cast test specimens were finished to have a dimension of 10 mm×10 mm×55 mm, and subjected to a Charpy impact strength test to measure an impact value in units of 1 kgf·m/cm$^2$. The results of this evaluation are also summarized in Table 1.

It is appreciated from Table 1 that all of the test specimens, made from copper-based alloy powder Nos. 1 through 6 of the First Preferred Embodiment, exhibited an impact value of more than 1.0 kgf·m/cm$^2$, and that they had improved toughness over those of the test specimens, made from comparative copper-based alloy Nos. 7 and 8.

It is believed that, in copper-based alloy powder Nos. 1 through 6, C was present in such a content that it inhibited the segregation. Specifically, the composite compounds, which included the carbide nuclei and the silicide deposited around the carbides nuclei, inhibited the silicides from agglomerating. Moreover, the composite compounds, working as hard phases, were dispersed evenly in the matrix.

On the other hand, it is believed that, in copper-based alloy powder No. 7, C was present in such a small content that it could not inhibit the segregation adequately. Accordingly, the silicides of Mo, and so on, agglomerated. Moreover, it is believed that, in copper-based alloy powder No. 8, C was present in such a large amount that free carbon precipitated to degrade the toughness of the test specimens.

Note that the same advantages were produced not only when Ti, Zr, Nb or V substituted for Mo in copper-based alloy powder Nos. 1 through 7, but also when two or more elements, which were selected from the group consisting of Mo, Ti, Zr, Nb and V, substituted for Mo in copper-based alloy powder Nos. 1 through 7.

Second Preferred Embodiment

In the Second Preferred Embodiment, the contents of Ni, Si, Co, Mo, Cr, Fe and O were controlled to 16.0% by weight, 2.80% by weight, 7.40% by weight, 6.2% by weight, 1.4% by weight, 4.90% by weight, and 0.0030% by weight, respectively. Moreover, the content of C was varied diversely. The raw alloying elements thus prepared were processed in the same manner as the First Preferred Embodiment to produce a variety of wear-resistant copper-based alloy powders which had a grain size of from 80 to 350 meshes.

Note that, also in the Second Preferred Embodiment, the contents of the inevitable impurities, such as Pb, Al, P, S, Sn, Zn, Bi, Sb, Mg, and so on, were not controlled. Accordingly, in the copper-based alloy powders of the Second Preferred Embodiment, it is believed that Pb was present as an inevitable impurity in an amount of about 0.03% by weight, and that the other inevitable impurities, such as Al, P, S, Sn, Zn, Bi, Sb, Mg, and so on, were present in a total amount of 0.5% by weight.

Figure 2:
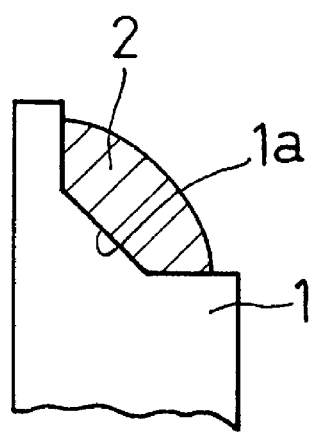
FIG. 2 is a cross-sectional view taken along line "2"—"2" of FIG. 1.

Moreover, a plurality of cylindrical test specimens 1 as illustrated in FIGS. 1 and 2 were made from an aluminum alloy. Note that the aluminum alloy was equivalent to an "AC2B" aluminum alloy as per JIS (Japanese Industrial Standard); namely: it included Cu in an amount of from 2.0 to 4.0% by weight, Si in an amount of from 5.0 to 7.0% by weight, Mg in an amount of 0.5% by weight or less, Zn in an amount of 1.0% by weight or less, Fe in an amount of 1.0% by weight or less, Mn in an amount of 0.5% by weight or less, Ni in an amount of 0.5% by weight or less, Ti in an amount of 0.2% by weight or less, and the balance of Al. The test specimens had an outside diameter of 50 mm and a height of 40 mm, and was provided with a slope 1a on the top surface. As illustrated in FIG. 2, the slope 1a tapered from wide to narrow in the direction toward the center.

The slope 1a of the cylindrical test specimens 1 was built-up with the wear-resistant copper-based alloy powders by means of laser under the following conditions:

Laser output: 4.5 kW;
Built-up width: from 3 to 10 mm;
Building-up rate: 900 mm/min.;
Shielding gas: Argon (Ar);
Flow of shielding gas: 10 L/min.; and
Built-up thickness: from 1.5 to 2.5 mm.

Thus, a built-up layer 2 was formed as illustrated in FIG. 2.

Evaluation on Weld-bead Cracks

Figure 3:
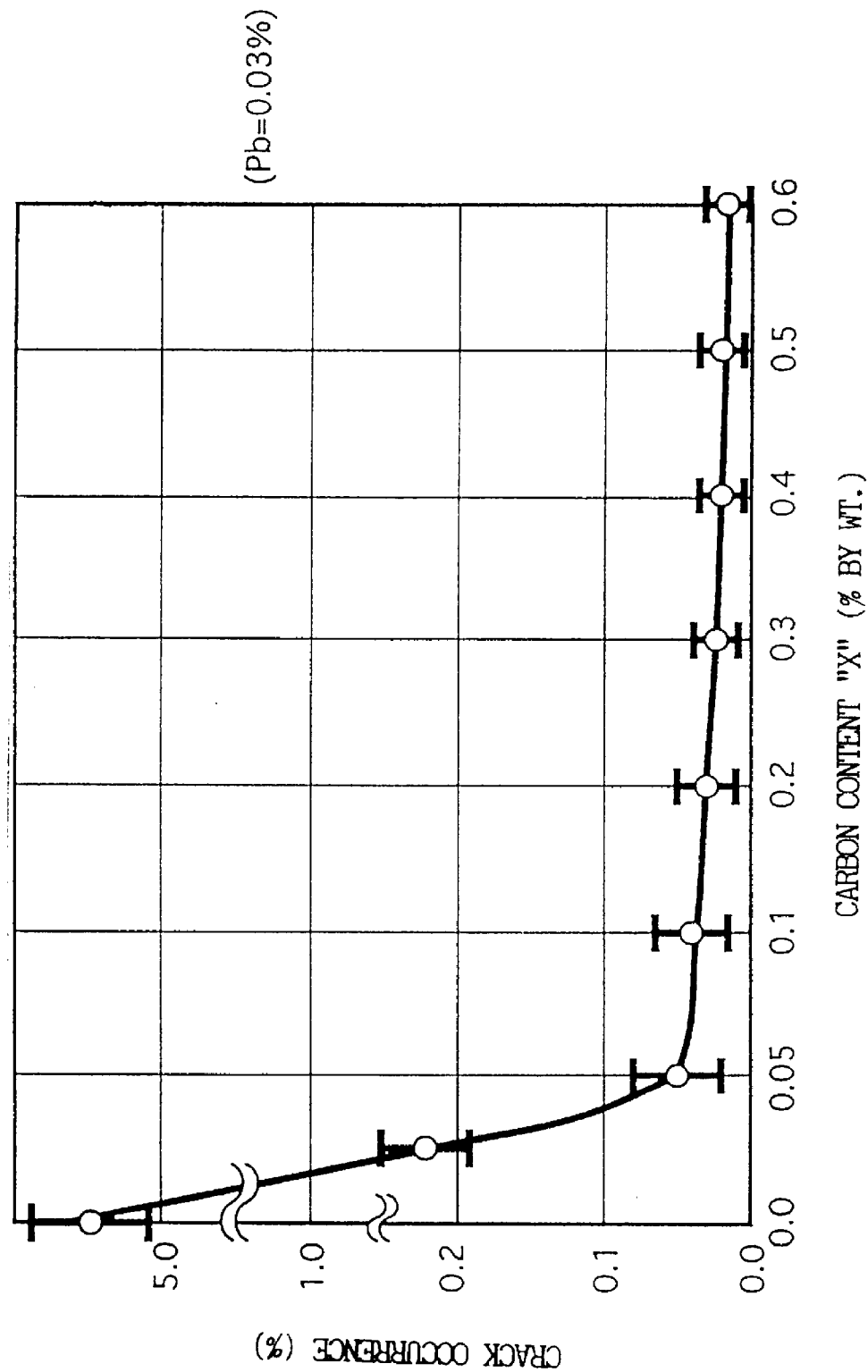
FIG. 3 is a diagram for illustrating a relationship between carbon content "X" and crack occurrence.

The resulting built-up layers 2 were examined for crack occurrence in the weld beads. FIG. 3 illustrates the results of this evaluation. In FIG. 3, the blank arrow designates the area where the silicides disappeared, and the toughness of the weld beads decreased because the carbides arose in a large amount.

Note that 100 pieces of the test specimens 1 in total were examined for crack occurrence, and the crack occurrence was calculated by the following equation:

(Crack Occurrence (%))={(Number of Cracked Test Specimens)/ (Total Test Specimens)}×100

It is apparent from FIG. 3 that the crack occurrence decreased sharply and could be suppressed to 0.05% or less when the C was present in an amount of 0.05% by weight or more. This phenomenon is understood as follows; namely: when no C is present or when the content of C is too small, the hard silicides agglomerate. On the other hand, when C is present in the controlled amount, the high-melting-point composite compounds arise. The composite compounds include carbides like $Mo_2C$, and silicides are formed and deposited around the carbides. The resulting copper-based alloy comes to have a metallic structure in which the composite compounds disperse evenly in the α-phase matrix of Cu-Ni alloy. As a result, the resulting copper-based alloy exhibits improved toughness.

Moreover, when the silicides agglomerate to form silicide hard phases, the absorption of laser beam increases at the silicides agglomeration locally 20 times as much as that of the α-phase matrix of Cu-Ni alloy, which is carried out by means of laser onto joints free from the silicides agglomeration. Thus, the aluminum-based substrate is melted excessively, and thereby diluted in the α-phase matrix of Cu-Ni alloy. As a result, the intermetallic compounds, such as Cu-Al and Ni-Al, arise in the α-phase matrix. The intermetallic compounds exhibit a weld-bead-fracture stress of 0.1% or less, and can hardly endure the shrinkage stress during solidification. Thus, cracks develop starting at the intermetallic compounds.

Let us consider the crack occurrence where a cylinder head having 16 valve seats is built-up with a copper-based alloy. It is understood from FIG. 3 that, when no C was present, the weld bead exhibited a crack occurrence of 5.5% or more. In the cylinder head having such a weld bead, it is assumed that the crack occurrence (or fraction defective) would increase up to 88%. Hence, such a copper-based alloy cannot be used practically. On the other hand, when the C was present in an amount of 0.05% by weight or more, the weld bead exhibited a crack occurrence of 0.05% or less. In the cylinder head having such a weld bead, it is assumed that the crack occurrence (or fraction defective) would decrease down to 0.8%. Hence, such a copper-based alloy can be used practically.

Evaluation on Fracture Strain in Built-up Layer

Figure 4:
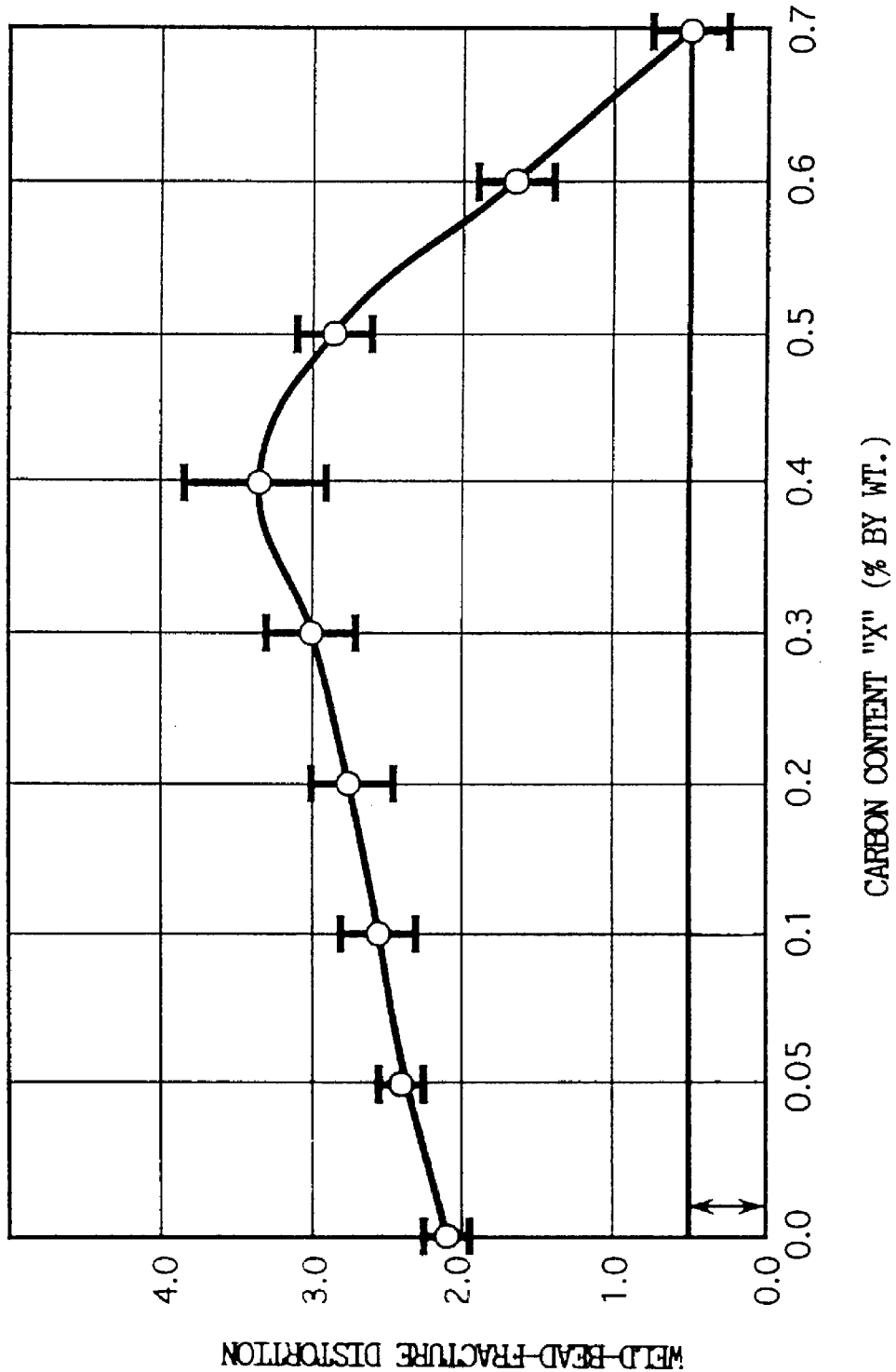
FIG. 4 is a diagram for illustrating a relationship between carbon content "X" and weld-bead-fracture distortion.
Figure 5:
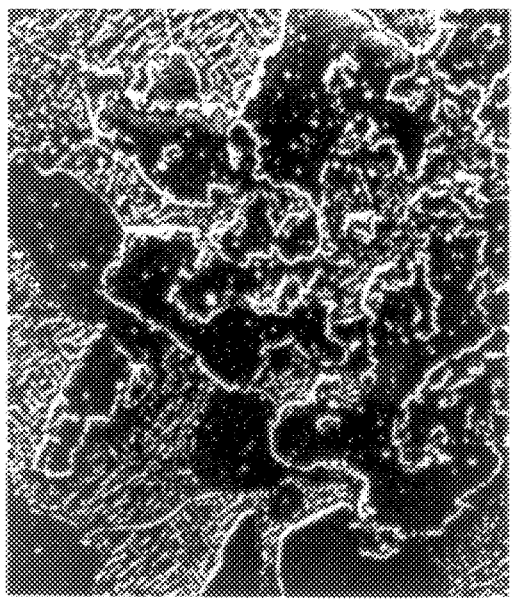
FIG. 5 is a scanning-electron-microscope photomicrograph for showing a metallic structure of a built-up layer which was made from a preferred embodiment of the present wear-resistant copper-based alloy whose carbon content was 0.05% by weight.
Figure 6:
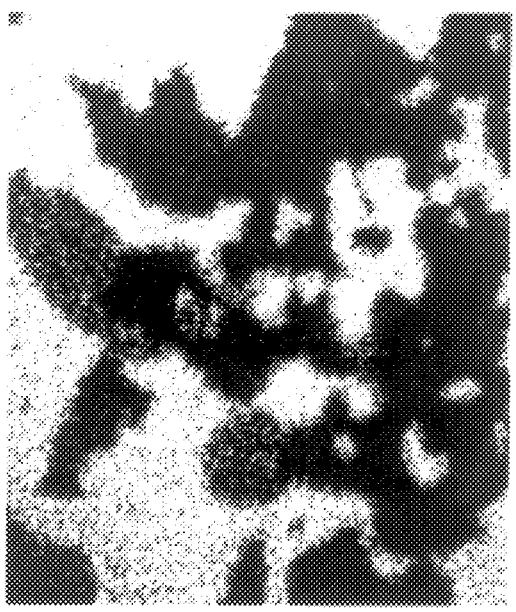
FIG. 6 is a scanning-electron-microscope photomicrograph for showing a metallic structure of a built-up layer which was made from the preferred embodiment shown in FIG. 5, and shows the copper component only.
Figure 7:
FIG. 7 is a scanning-electron-microscope photomicrograph for showing a metallic structure of a built-up layer which was made from the preferred embodiment shown in FIG. 5, and shows the nickel component only.
Figure 8:
FIG. 8 is a scanning-electron-microscope photomicrograph for showing a metallic structure of a built-up layer which was made from the preferred embodiment shown in FIG. 5, and shows the molybdenum component only.
Figure 9:
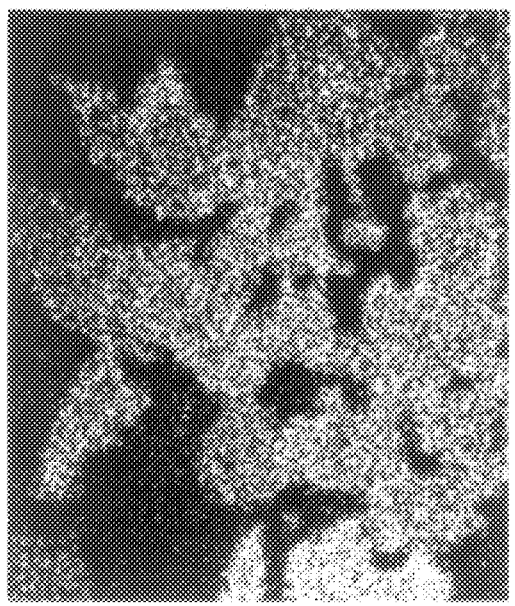
FIG. 9 is a scanning-electron-microscope photomicrograph for showing a metallic structure of a built-up layer which was made from the preferred embodiment shown in FIG. 5, and shows the silicon component only.
Figure 10:
FIG. 10 is a scanning-electron-microscope photomicrograph for showing a metallic structure of a built-up layer which was made from the preferred embodiment shown in FIG. 5, and shows the carbon component only.
Figure 11:
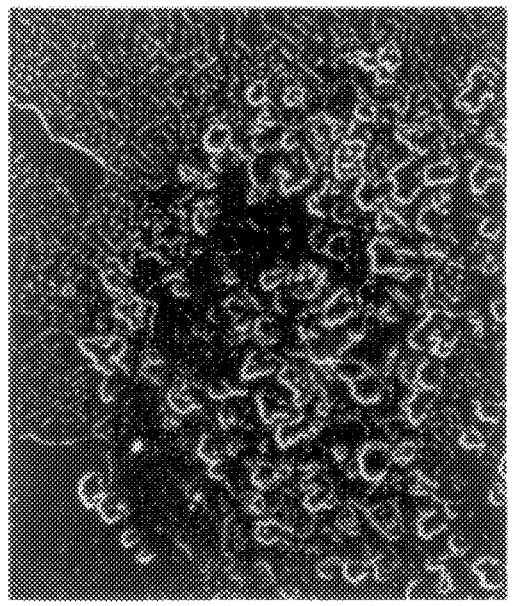
FIG. 11 is a scanning-electron-microscope photomicrograph for showing a metallic structure of a built-up layer which was made from a preferred embodiment of the present wear-resistant copper-based alloy whose carbon content was 0.5% by weight.
Figure 12:
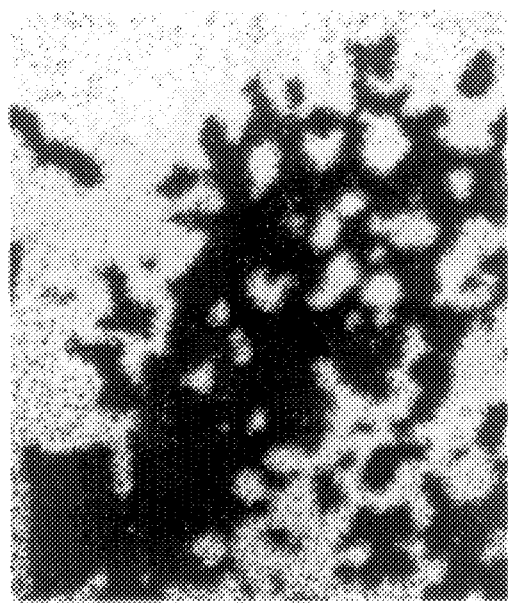
FIG. 12 is a scanning-electron-microscope photomicrograph for showing a metallic structure of a built-up layer which was made from the preferred embodiment shown in FIG. 11, and shows the copper component only.
Figure 13:
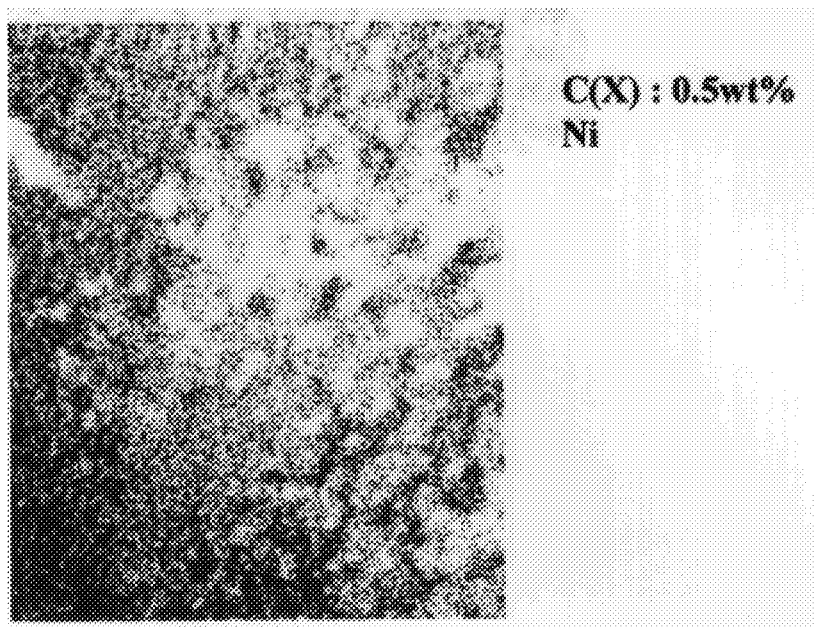
FIG. 13 is a scanning-electron-microscope photomicrograph for showing a metallic structure of a built-up layer which was made from the preferred embodiment shown in FIG. 11, and shows the nickel component only.
Figure 14:
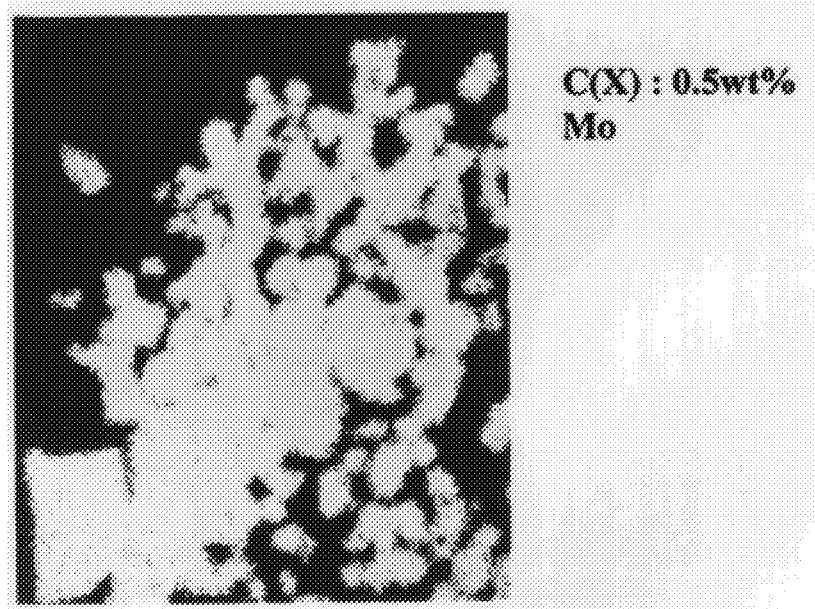
FIG. 14 is a scanning-electron-microscope photomicrograph for showing a metallic structure of a built-up layer which was made from the preferred embodiment shown in FIG. 11, and shows the molybdenum component only.
Figure 15:
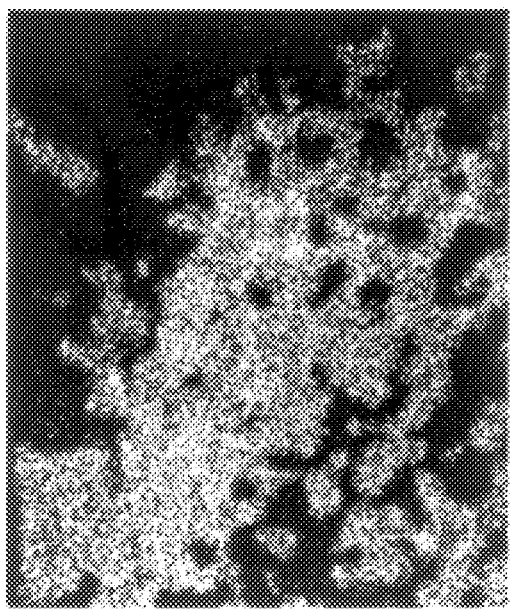
FIG. 15 is a scanning-electron-microscope photomicrograph for showing a metallic structure of a built-up layer which was made from the preferred embodiment shown in FIG. 11, and shows the silicon component only.
Figure 16:
FIG. 16 is a scanning-electron-microscope photomicrograph for showing a metallic structure of a built-up layer which was made from the preferred embodiment shown in FIG. 11, and shows the carbon component only.
Figure 17:
FIG. 17 is a scanning-electron-microscope photomicrograph for showing a metallic structure of a built-up layer which was made from a comparative copper-based alloy whose carbon content was 0.7% by weight.
Figure 18:
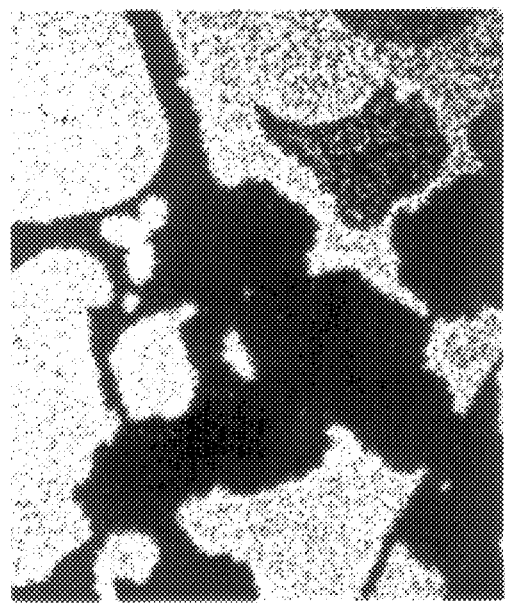
FIG. 18 is a scanning-electron-microscope photomicrograph for showing a metallic structure of a built-up layer which was made from the comparative copper-based alloy shown in FIG. 17, and shows the copper component only.
Figure 19:
FIG. 19 is a scanning-electron-microscope photomicrograph for showing a metallic structure of a built-up layer which was made from the comparative copper-based alloy shown in FIG. 17, and shows the nickel component only.
Figure 20:
FIG. 20 is a scanning-electron-microscope photomicrograph for showing a metallic structure of a built-up layer which was made from the comparative copper-based alloy shown in FIG. 17, and shows the molybdenum component only.
Figure 21:
FIG. 21 is a scanning-electron-microscope photomicrograph for showing a metallic structure of a built-up layer which was made from the comparative copper-based alloy shown in FIG. 17, and shows the silicon component only.
Figure 22:
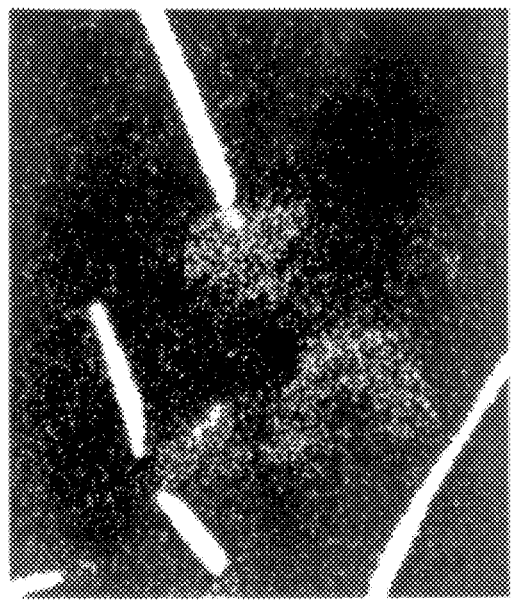
FIG. 22 is a scanning-electron-microscope photomicrograph for showing a metallic structure of a built-up layer which was made from the comparative copper-based alloy shown in FIG. 17, and shows the carbon component only.

The built-up layers 2, prepared in the Second Preferred Embodiment, were examined for fracture strain. For example, the built-up layers 2 were machined to test specimens formed as a rectangular parallelpiped of 15 mm×25 mm×10 mm. The test specimens were subjected to a load at the center of its length (e.g., 25 mm). Thus, the test specimens were bent, and were examined for a length variation (or an elongation from 25 mm) at fracture to calculate a fracture strain. Note that the load was applied to the test specimens at a rate of 0.02 mm/sec. The fracture strain was determined by the following equation:

(Fracture Strain (%))={("A"−"B")/"A"}×100;

wherein "A" designates the length of the test specimen before the test, and "B" designates the length of the test specimen at fracture (or after the test). FIG. 4 illustrates the results of the fracture-strain evaluation. In FIG. 4, the double-headed arrow designates the area where cracks occurred due to thermal shrinkage.

As can be appreciated from FIG. 4, the larger the carbon content was, the greater the fracture strain was, and the more the weld beads were unlikely to crack. However, when the carbon content exceeded 0.4% by weight, the fracture strain decreased. Thus, the weld beads were likely to crack due to the thermal shrinkage. It is believed that the fracture strain decreased because $Mo_2C$ precipitated excessively when the carbon content exceeded 0.4% by weight. Therefore, it is preferred that the upper limit of the carbon content be 0.4% by weight.

Evaluation on Transformation of Hard Phase

Three of the built-up layers 2 of the Second Preferred Embodiment were observed by a scanning electron microscope (SEM) for their metallic structure. Note that the 3 built-up layers 2 had a carbon content of 0.05% by weight, 0.5% by weight and 0.7% by weight, respectively. FIGS. 5 through 22 shows the results of this observation as SEM photomicrographs.

FIGS. 5 through 10 show the built-up layer 2 whose carbon content was 0.05% by weight. FIGS. 11 through 16 show the built-up layer 2 whose carbon content was 0.5% by weight. FIGS. 17 through 22 show the built-up layer 2 whose carbon content was 0.7% by weight. Note that, in FIGS. 6 through 10, FIGS. 12 through 16, and FIGS. 18 through 22, the whitish portions are highly-concentrated portions of Cu, Ni, Mo, Si, and C. These photomicrographs clearly show that the high-melting-point composite compounds were formed which included the nuclei of carbides, such as MoC, and silicides deposited around the nuclei.

Whereas, FIGS. 17 through 22 show the built-up layer 2 which was made from comparative copper-based alloy, and whose carbon content was 0.7% by weight. As can be easily seen from FIG. 22, the free carbon, the whitish rod-like portions, precipitated in the comparative built-up layer 2.

Evaluation on Dispersibility of Hard Phase

Except that the carbon content was varied to 0.0006% by weight, 0.01% by weight, 0.03% by weight, 0.05% by weight, 0.1% by weight, 0.2% by weight, 0.5% by weight, and 0.7% by weight, the other raw alloying elements were prepared in the same amounts as those of the Second Preferred Embodiment. The raw alloying elements were heated to 1,500° C. to prepare 8 molten metals. The raw alloying elements were cast into ingots. The resulting ingots were cut, and their cross-sections were observed by an optical microscope. FIGS. 23 through 30 show the results of this observation as photomicrographs. Note that the molten metals were solidified by cooling them gradually at a rate of from 10° to $10^{2°}$ C./sec.

Figure 23:
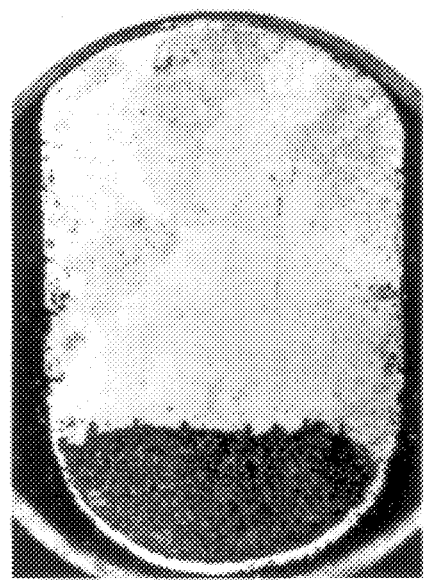
FIG. 23 is an electron-microscope photomicrograph for showing a metallic structure of a cast ingot in cross-section, the cast ingot made from a comparative copper-based alloy whose carbon content was 0.0006% by weight.
Figure 24:
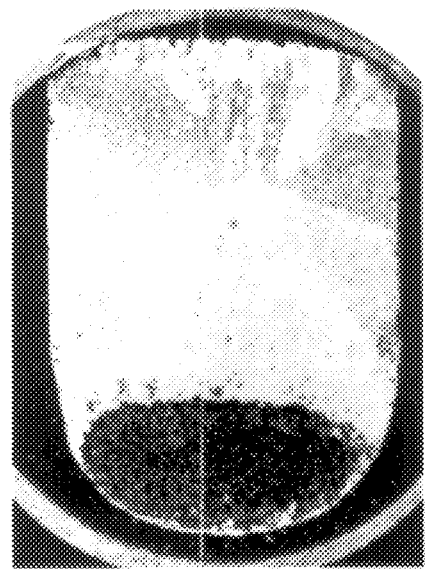
FIG. 24 is an electron-microscope photomicrograph for showing a metallic structure of a cast ingot in cross-section, the cast ingot made from a comparative copper-based alloy whose carbon content was 0.01% by weight.
Figure 25:
FIG. 25 is an electron-microscope photomicrograph for showing a metallic structure of a cast ingot in cross-section, the cast ingot made from a comparative copper-based alloy whose carbon content was 0.03% by weight.
Figure 26:
FIG. 26 is an electron-microscope photomicrograph for showing a metallic structure of a cast ingot in cross-section, the cast ingot made from a preferred embodiment of the present copper-based alloy whose carbon content was 0.05% by weight.
Figure 27:
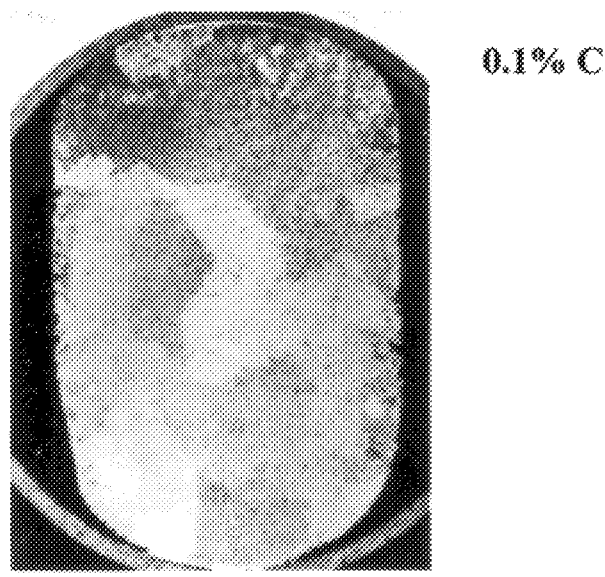
FIG. 27 is an electron-microscope photomicrograph for showing a metallic structure of a cast ingot in cross-section, the cast ingot made from a preferred embodiment of the present copper-based alloy whose carbon content was 0.1% by weight.
Figure 28:
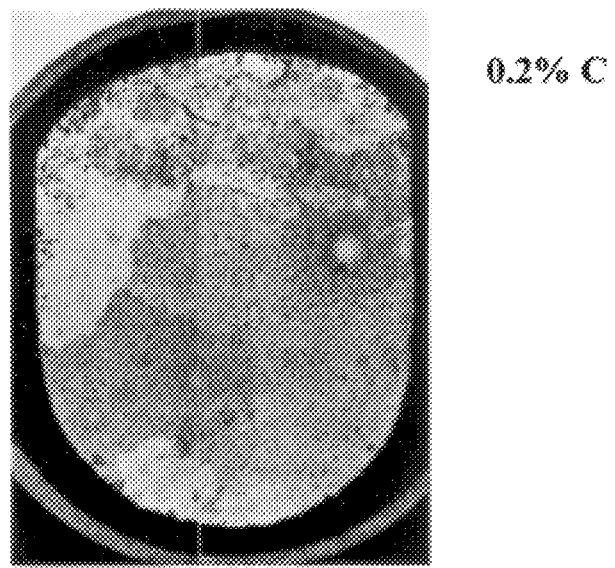
FIG. 28 is an electron-microscope photomicrograph for showing a metallic structure of a cast ingot in cross-section, the cast ingot made from a preferred embodiment of the present copper-based alloy whose carbon content was 0.2% by weight.
Figure 29:
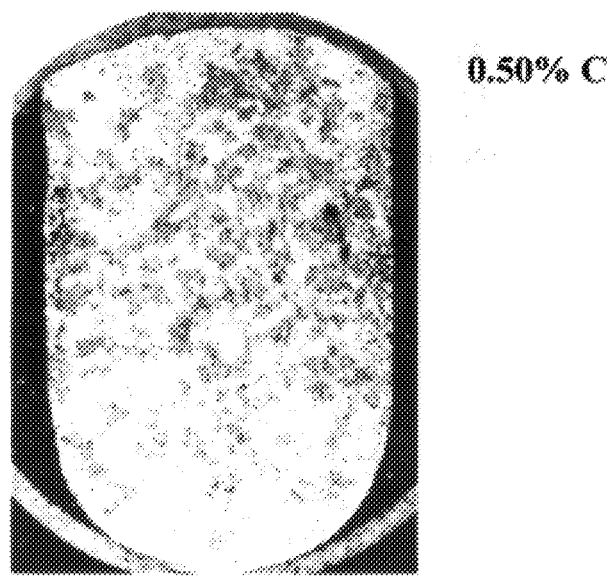
FIG. 29 is an electron-microscope photomicrograph for showing a metallic structure of a cast ingot in cross-section, the cast ingot made from a preferred embodiment of the present copper-based alloy whose carbon content was 0.5% by weight.
Figure 30:
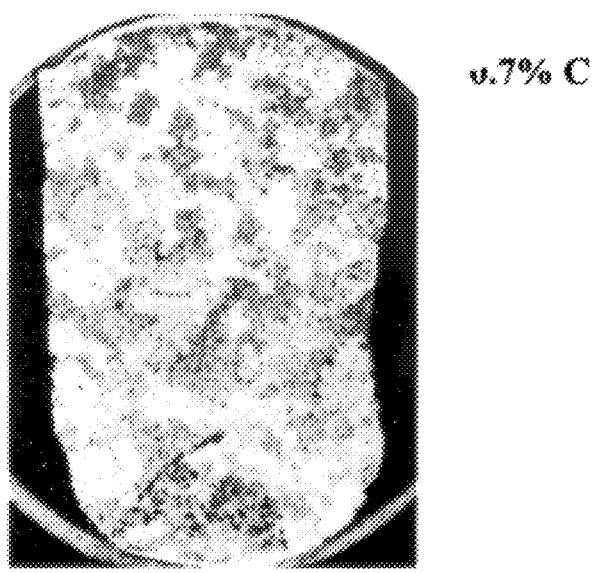
FIG. 30 is an electron-microscope photomicrograph for showing a metallic structure of a cast ingot in cross-section, the cast ingot made from a comparative copper-based alloy whose carbon content was 0.7% by weight.

FIGS. 26 through 30 show that, when the carbon content "X" was 0.05% by weight or more, the high-melting-point composite compounds were formed which included nuclei of the carbides, and silicides deposited around the nuclei, and that the composite compounds were dispersed evenly and finely in the α-phase matrix of Cu-Ni alloy. On the contrary, FIGS. 23 through 25 show that, when the carbon content "X" was less than 0.05% by weight (i.e., "X"<0.05), silicides (i.e., the blackish portions) agglomerated below.

Third Preferred Embodiment

In the Third Preferred Embodiment, the contents of Ni, Si, Co, Mo, Cr, and Fe were fixed to 16.0% by weight, 2.80% by weight, 7.40% by weight, 6.2% by weight, 1.4% by weight, and 4.90% by weight, respectively. Moreover, the contents of C and O were varied diversely. The raw alloying elements thus prepared were processed in the same manner as the First Preferred Embodiment to produce a variety of wear-resistant copper-based alloy powders which had a grain size of from 80 to 350 meshes.

Note that, also in the Third Preferred Embodiment, the contents of the inevitable impurities, such as Pb, Al, P, S, Sn, Zn, Bi, Sb, Mg, and so on, were not controlled. Accordingly, in the copper-based alloy powders of the Third Preferred Embodiment, it is believed that Pb was present as an inevitable impurity in an amount of about 0.03% by weight, and that the other inevitable impurities, such as Al, P, S, Sn, Zn, Bi, Sb, Mg, and so on, were present in a total amount of 0.5% by weight.

The resulting copper-based alloy powders were used to form the built-up layer 2 as illustrated in FIGS. 1 and 2 by means of laser under the same conditions as those of the Second Preferred Embodiment.

Evaluation on Weld-bead Cracks

Figure 31:
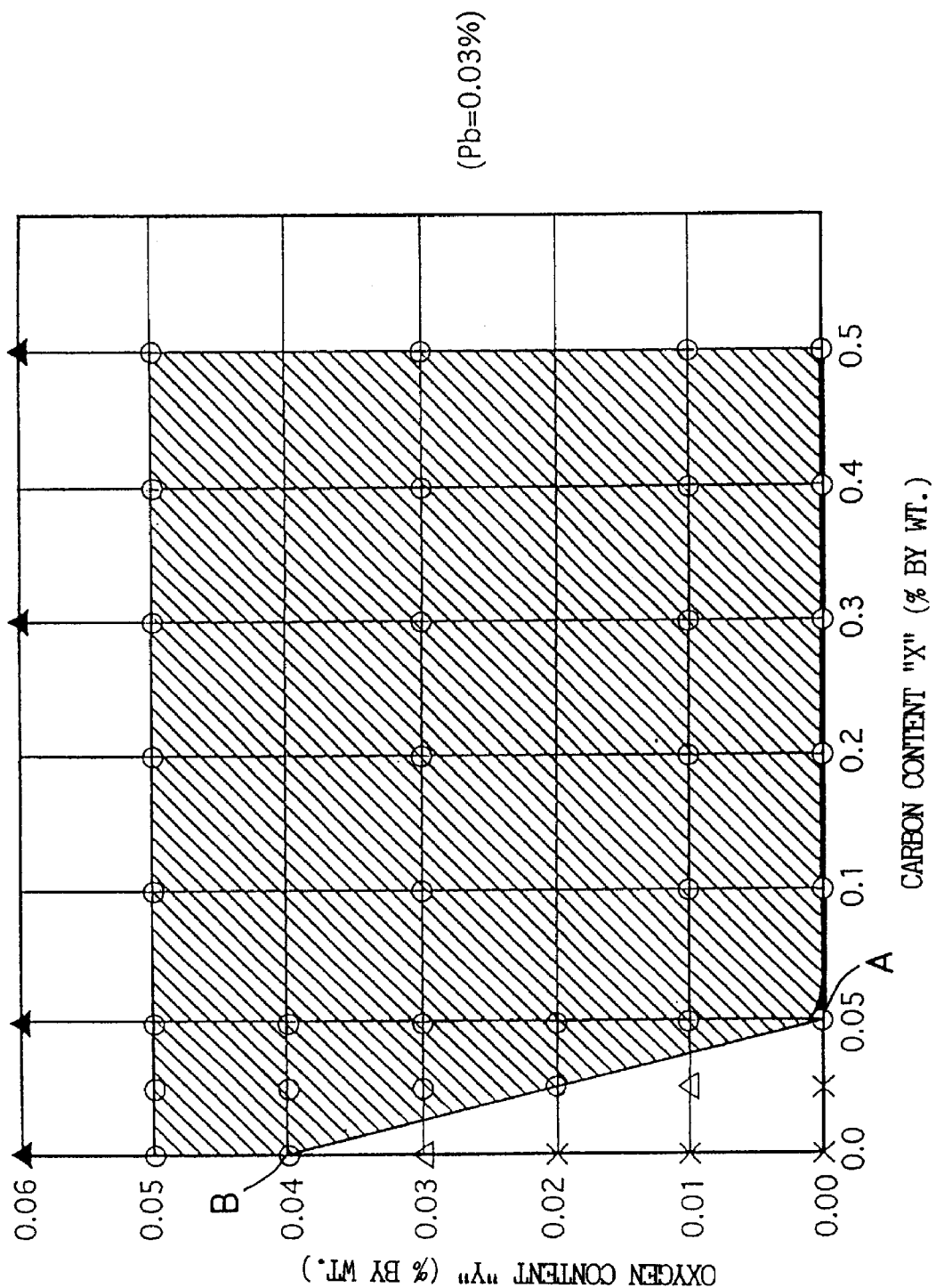
FIG. 31 is a diagram for illustrating a relationship among carbon content "X", oxygen content "Y" and crack occurrence.

The resulting built-up layers 2 were examined for crack occurrence and pin holes in the weld beads. FIG. 31 illustrates the results of this evaluation. In FIG. 31, blank circles (◯) designate the crack occurrence of 0.05% or less, blank triangles (Δ) designate the crack occurrence of from 0.05 to 1.0%, crosses (X) designate the crack occurrence of 1.0% or more, and solid triangles (▲) designate the occurrence of appreciable pin holes. Also in FIG. 31, the blank arrow designates the area where the silicides disappeared, and the toughness of the weld beads decreased because the carbides arose in a large amount.

Note that 100 pieces of the test specimens 1 in total were examined for crack occurrence, and the crack occurrence was calculated by the following equation:

(Crack Occurrence (%))={(Number of Cracked Test Specimens)/(Total Test Specimens)}×100

It is apparent from FIG. 31 that, when the carbon content "X" and oxygen content "Y" satisfied the aforementioned relationships (1) through (3), the crack occurrence could be reduced to 0.05% or less, and simultaneously the pin holes were inhibited from developing. Note that the line connecting point "A" (i.e., (0.05, 0)) and point "B" (i.e., (0, 0.04) is expressed by an equation, "Y"=(−0.8)("X")+0.04.

Fourth Preferred Embodiment

In the Fourth Preferred Embodiment, the contents of the inevitable impurities, such as Pb, Al, P, S, Sn, Zn, Bi, Sb, Mg, and so on, were controlled so as not to mingle them during the copper-based-alloy powder preparation ranging from the melting process to the atomizing process, and that the contents of the inevitable impurities were adjusted as described below. Except this inevitable-impurities control, the Fourth Preferred Embodiment was carried out in the same manner as the Second Preferred Embodiment. Namely, the contents of Ni, Si, Co, Mo, Cr, Fe, and O were fixed as those of the Second Preferred Embodiment, and the content of C was varied diversely.

Specifically, in the Fourth Preferred Embodiment, the content of Pb was 0.01% by weight, and the contents of the other inevitable impurities, such as Al, P, S, Sn, Zn, Bi, Sb, and Mg, were 0.05% by weight in total.

The resulting copper-based alloy powders were used to form the built-up layer 2 as illustrated in FIGS. 1 and 2 by means of laser under the same conditions as those of the Second Preferred Embodiment.

Evaluation on Weld-bead Cracks

Figure 32:
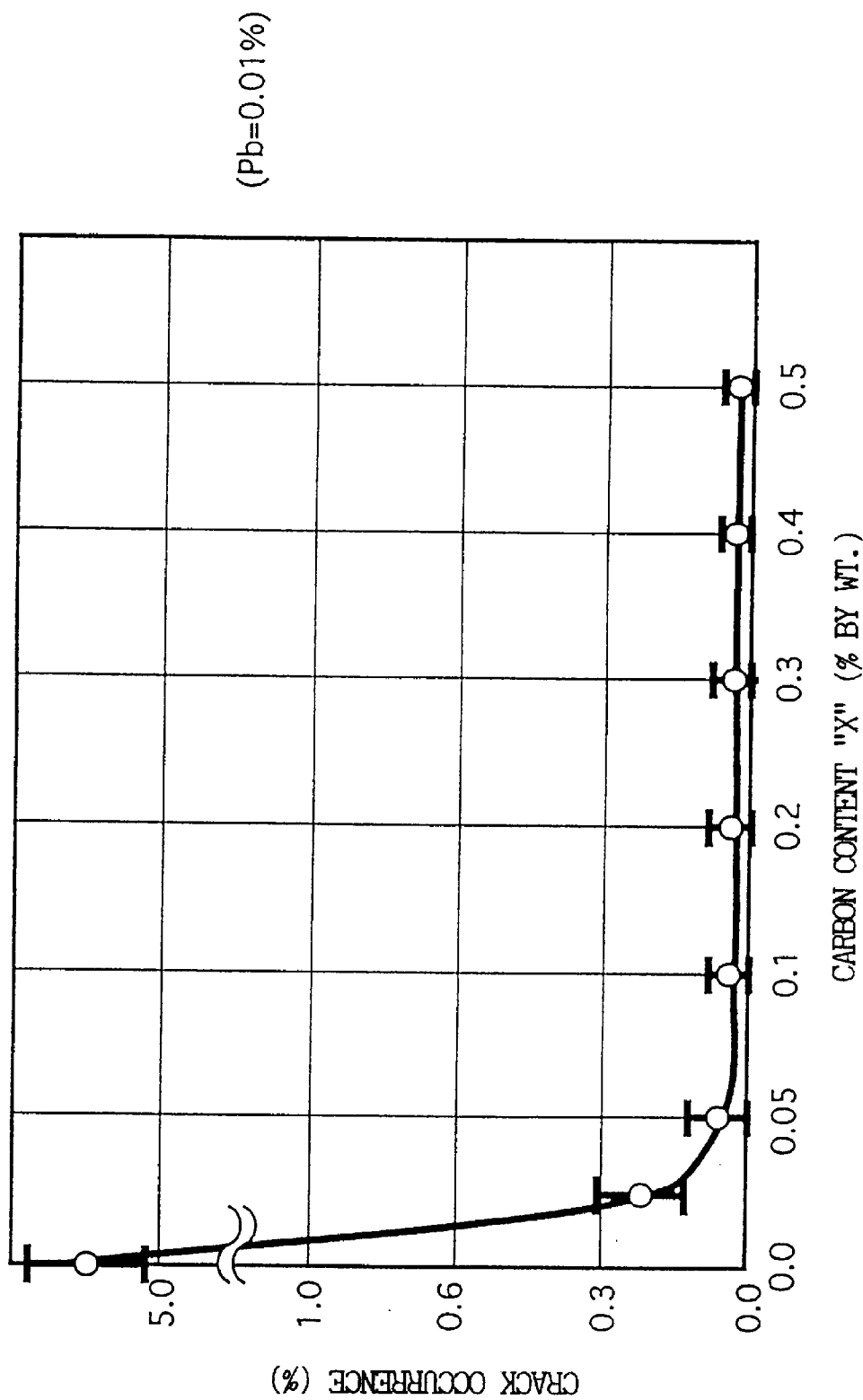
FIG. 32 is a diagram for illustrating a relationship between carbon content "X" and crack occurrence.

The resulting built-up layers 2 were examined for crack occurrence. FIG. 32 illustrates the results of this evaluation. As can be appreciated from FIG. 32, the built-up layers 2 made from the copper-based alloy powders of the Fourth Preferred Embodiment exhibited a crack-occurrence characteristic similar to those of the First Preferred Embodiment illustrated in FIG. 3. Note that, compared with FIG. 3, the effect of the carbon content shifts to a smaller side in FIG. 32; namely: the crack occurrence decreased even when the carbon content was 0.05% by weight or less (e.g., 0.03% by weight).

Fifth Preferred Embodiment

In the Fifth Preferred Embodiment, the content of Pb, one of the inevitable impurities, was adjusted to 0.01% by weight, the contents of Al, P, S, Sn, Zn, Bi, Sb, and Mg, the other inevitable impurities, were adjusted to 0.05% by weight in total. Except this inevitable-impurities control, the Fifth Preferred Embodiment was carried out in the same manner as the Third Preferred Embodiment. Namely, the contents of Ni, Si, Co, Mo, Cr, and Fe were fixed as those of the Third Preferred Embodiment, and the contents of C and O were varied diversely.

The resulting copper-based alloy powders were used to form the built-up layer 2 as illustrated in FIGS. 1 and 2 by means of laser under the same conditions as those of the Second Preferred Embodiment.

Evaluation on Weld-bead Cracks

Figure 33:
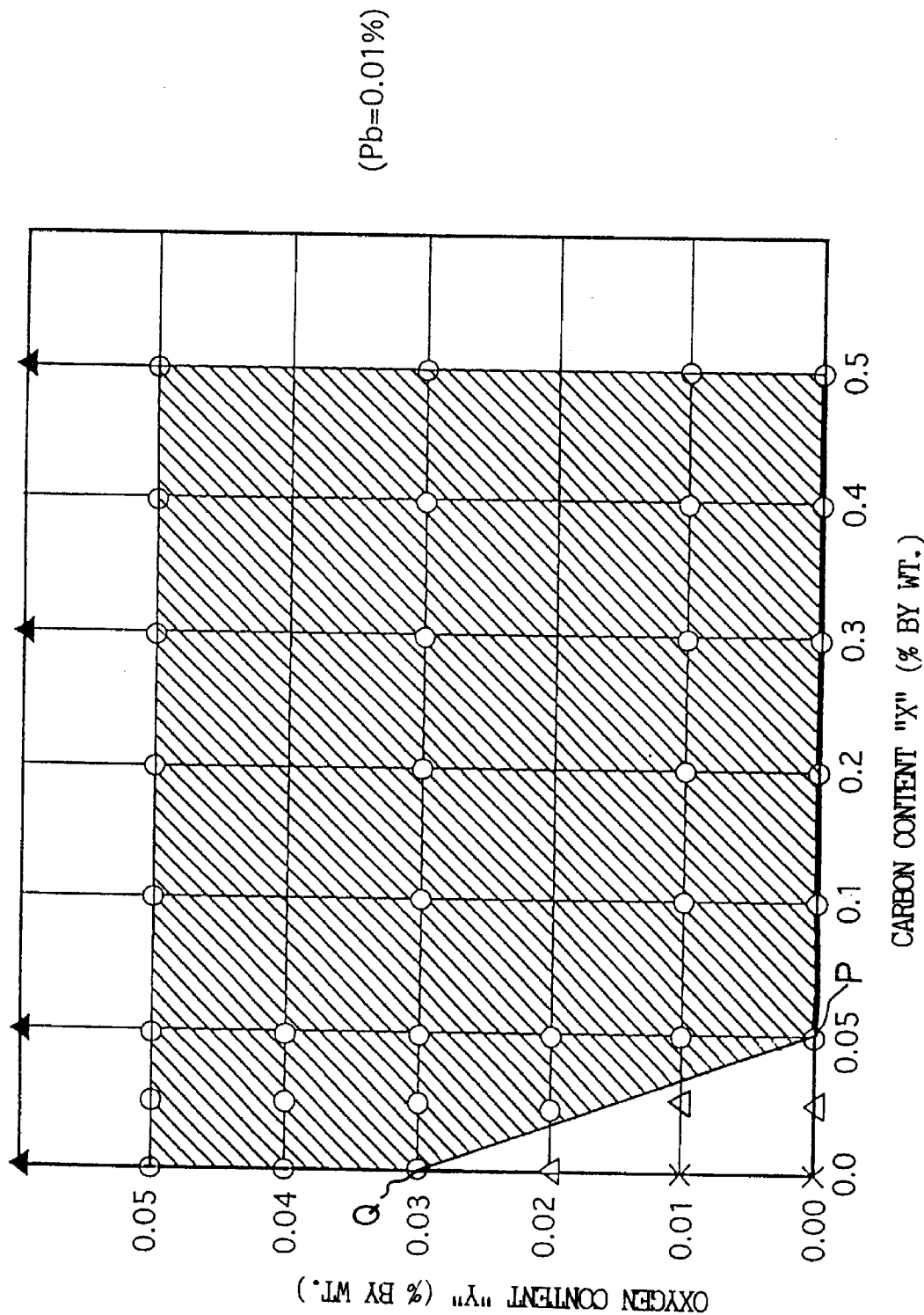
FIG. 33 is a diagram for illustrating a relationship among carbon content "X", oxygen content "Y" and crack occurrence.

The resulting built-up layers 2 were examined for crack occurrence and pin holes in the weld beads in the same manner as the Third Preferred Embodiment. FIG. 33 illustrates the results of this evaluation. In FIG. 33, blank circles (◯) designate the crack occurrence of 0.05% or less, blank triangles (Δ) designate the crack occurrence of from 0.05 to 1.0%, crosses (X) designate the crack occurrence of 1.0% or more, and solid triangles (▲) designate the occurrence of appreciable pin holes. As can be appreciated from FIG. 33, the built-up layers 2 made from the copper-based alloy powders of the Fifth Preferred Embodiment exhibited a crack-occurrence and pin-hole-occurrence characteristic similar to those of the Third Preferred Embodiment illustrated in FIG. 31. Note that, compared with FIG. 31, the hatched area, resulting in the reduction of the crack- and pin-hole-occurrences, broadens to the smaller carbon-content side in FIG. 33; namely: the crack occurrence decreased even when the carbon content was 0.05% by weight or less.

Thus, it is understood from FIG. 33 that, when the content of Pb was controlled to 0.01% by weight, and when the carbon content "X" and oxygen content "Y" satisfied the aforementioned relationships (1), (2) and (4), the crack occurrence could be reduced to 0.05% or less, and simultaneously the pin holes were inhibited from developing. Note that the line connecting point "P" (i.e., (0.05, 0)) and point "Q" (i.e., (0, 0.03) is expressed by an equation, "Y"=(−0.6)("X")+0.03.

Sixth Preferred Embodiment

In the Sixth Preferred Embodiment, the contents of Ni, Si, Co, Mo, Cr, Fe, C, and O were fixed to 16.0% by weight, 2.80% by weight, 7.40% by weight, 6.2% by weight, 1.4% by weight, 4.90% by weight, 0.1% by weight, and 0.0030% by weight, respectively. Moreover, the content of Pb was varied diversely. Then, the raw alloying elements thus prepared were processed in the same manner as the First Preferred Embodiment to produce a variety of wear-resistant copper-based alloy powders which had a grain size of from 80 to 350 meshes.

Note that, also in the Sixth Preferred Embodiment, the contents of the inevitable impurities, such as Al, P, S, Sn, Zn, Bi, Sb, Mg, and so on, were not controlled. Accordingly, in the copper-based alloy powders of the Sixth Preferred Embodiment, it is believed that the inevitable impurities, such as Al, P, S, Sn, Zn, Bi, Sb, Mg, and so on, were present in a total amount of about 0.5% by weight.

The resulting copper-based alloy powders were used to form the built-up layer 2 as illustrated in FIGS. 1 and 2 by means of laser under the same conditions as those of the Second Preferred Embodiment.

Evaluation on Weld-bead Cracks

Figure 34:
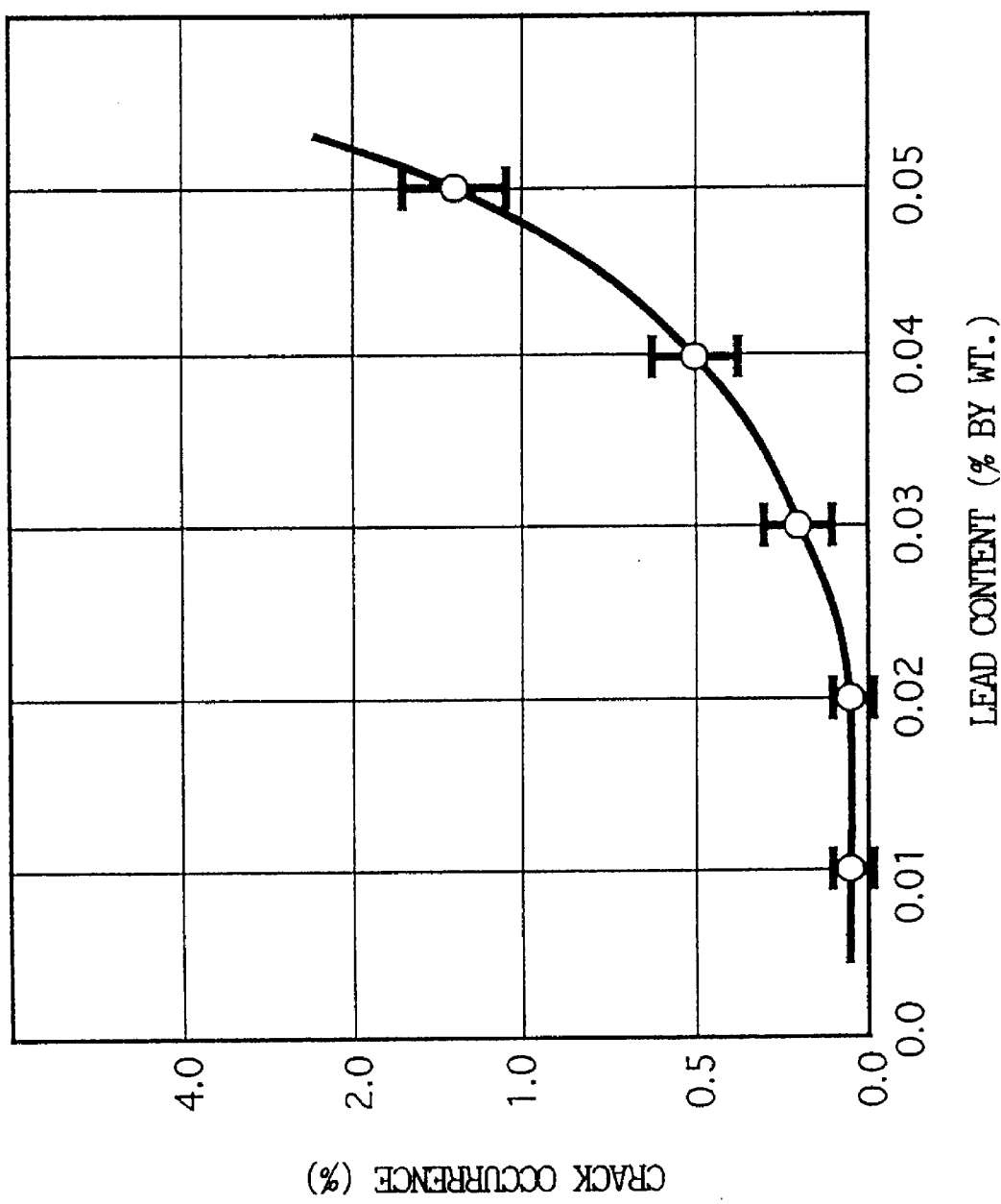
FIG. 34 is a diagram for illustrating a relationship between lead (Pb) content and crack occurrence.

The resulting built-up layers 2 were examined for crack occurrence in the weld beads in the same manner as the Second Preferred Embodiment. FIG. 34 illustrates the results of this evaluation. As can be seen from FIG. 34, it was found that the smaller Pb content was preferable, because the crack occurrence decreased accordingly. However, when the Pb content exceeded 0.02% by weight, the crack occurrence increased sharply.

All of the inevitable impurities, Al, P, S, Sn, Zn, Bi, Sb, and Mg, are elements of low melting point and low boiling point. Contrary to Pb, the other inevitable impurities, such as Al, P, S, Sn, Zn, Bi, Sb, and Mg, are soluble in the present wear-resistant copper-based alloy; namely: they are soluble in the α-phase matrix of Cu-Ni alloy when they are present in a trace amount. Consequently, the other inevitable impurities do not precipitate in completely solidified portions. However, in the building-up operation employing a high-temperature heat source like laser, the built-up layer is heated at a maximum temperature which reaches in a range of from 2,800° to 3,000° C. maximally. As a result, Al, P, S, Sn, Zn, Bi, Sb, and Mg vaporize and remain in the built-up layer to cause the gas defects even when they are present in a trace amount. Therefore, it is preferred that the inevitable impurities, Al, P, S, Sn, Zn, Bi, Sb, and Mg, are present in an amount as small as possible, for instance, in a total amount of 0.05% by weight.

Moreover, when the present wear-resistant copper-based alloy is used to build-up by means of laser, it is preferred that at least one element selected from the group consisting of Y, misch metal, and Hf is present in an amount of from 0.01 to 0.1% by weight. These elements bond with O to form a stable oxide film when the laser-building-up operation is carried out. The oxide film absorbs laser beam stably, forms a proper pool of molten metal, and subsidizes the resulting molten-metal pool. This advantageous effect can be produced when one of the elements is present or when two or more of them are present.

Note that, when two or more of the elements are present, they are preferably present in a total amount of from 0.01 to 0.1% by weight. When two or more of them are present in a total amount of less than 0.01% by weight, they produce the oxide film less, the reflectance of laser beam increases, and the molten-metal pool arises improperly. As a result, various defects are likely to occur in the resulting build-up layer. When two or more of them are present in a total amount of more than 0.1% by weight, they produce the oxide film to a greater extent, and the absorption of laser beam increases. As a result, the substrate is likely to be heated excessively and diluted too much. Additionally, the flowability of molten metal is likely to degrade in the production of powder.

In addition, the above-described preferred embodiments deal with the case where the present wear-resistant copper-based alloy was applied to the powder building-up operation by means of laser. It is believed that the present wear-resistant copper-based alloy can be applied to a variety of building-up operations which employ the other energy sources, such as plasma, acetylene gas, TIG, and the like.

Having now fully described the present invention, it will be apparent to one of ordinary skill in the art that many changes and modifications can be made thereto without departing from the spirit or scope of the present invention as set forth herein including the appended claims.

What is claimed is:

1. A wear-resistant copper-based alloy useful for a surface building-up operation, consisting essentially of:

nickel (Ni) in an amount of from 10.0 to 30.0% by weight;

iron (Fe) in an amount of from 2.0 to 15.0% by weight;

cobalt (Co) in an amount of from 2.0 to 15.0% by weight;

silicon (Si) in an amount of from 0.5 to 5.0% by weight;

chromium (Cr) in an amount of from 1.0 to 10.0% by weight;

at least one first optional element selected from the group consisting of molybdenum (Mo), titanium (Ti), zirconium (Zr), niobium (Nb) and vanadium (V) in an amount of from 2.0 to 15.0% by weight;

an amount of carbon (C) and oxygen (O) effective to inhibit welding bead cracking during build-up of said alloy; and the balance of copper (Cu) and inevitable impurities;

wherein a content of said C, designated by "X"% by weight, and a content of said O, designated by "Y"% by weight, satisfy the following relationships (1) through (3);

(1): $0 < "X" \leq 0.5$;

(2): $0 < "Y" \leq 0.05$; and (4): $"Y" \geq (-0.8)("X") + 0.04$; and lead (Pb), one of said inevitable impurities, is restricted to an amount of 0.03% by weight or less.

2. The wear-resistant copper-based alloy according to claim 1, wherein said Ni is present in an amount of from 12.0 to 25.0% by weight.

3. The wear-resistant copper based alloy according to claim 1, wherein the copper-based alloy comprises a built-up layer on an aluminum-based substrate, the built-up layer comprising an α-phase matrix containing carbide and silicide particles.

4. The wear-resistant copper based alloy according to claim 1, wherein the alloy comprises an α-phase matrix containing carbide and silicide precipitates uniformly dispersed in the matrix.

5. The wear-resistant copper based alloy according to claim 1, wherein the alloy includes oxygen in an amount effective to form a protective oxide layer on an exposed surface of the alloy.

6. The wear-resistant copper based alloy according to claim 1, wherein the alloy includes oxygen in an amount sufficient to form a $SiO_2$ layer and the alloy includes 0.05 to 0.5 weight % carbon.

7. The wear-resistant copper based alloy according to claim 1, wherein the alloy contains Al, P, S, Sn, Zn, Bi, Sb and Mg in a total amount of up to 0.5 weight %.

8. A wear-resistant copper-based alloy useful for a surface building-up operation, consisting essentially of:

nickel (Ni) in an amount of from 10.0 to 30.0% by weight;

iron (Fe) in an amount of from 2.0 to 15.0% by weight;

cobalt (Co) in an amount of from 2.0 to 15.0% by weight;

silicon (Si) in an amount of from 0.5 to 5.0% by weight;

chromium (Cr) in an amount of from 1.0 to 10.0% by weight;

at least one first optional element selected from the group consisting of molybdenum (Mo), titanium (Ti), zirconium (Zr), niobium (Nb) and vanadium (V) in an amount of from 2.0 to 15.0% by weight;

an amount of carbon (C) and oxygen (O) effective to inhibit welding bead cracking during build-up of said alloy; and the balance of copper (Cu) and inevitable impurities;

wherein a content of said C, designated by "X"% by weight, and a content of said O, designated by "Y"% by weight, satisfy the following relationships (1), (2) and (4);

(1): $0 < \text{"X"} \leq 0.5$;

(2): $0 < \text{"Y"} \leq 0.05$; and (3): $\text{"Y"} \geq (-0.6)(\text{"X"}) + 0.03$; and lead (Pb), one of said inevitable impurities, is restricted to an amount of 0.02% by weight or less.

9. The wear-resistant copper-based alloy according to claim 8, wherein said inevitable impurities, aluminum (Al), phosphorus (P), sulfur (S), tin (Sn), zinc (Zn), bismuth (Bi), antimony (Sb), and magnesium (Mg), are present in a total amount of 0.05% by weight or less.

10. The wear-resistant copper-based alloy according to claim 8, wherein at least one optional element selected from the group consisting of yttrium (Y), misch metal, and hafnium (Hf) is present in an amount of from 0.01 to 0.1% by weight.

11. The wear-resistant copper-based alloy according to claim 8, wherein said Ni is present in an amount of from 12.0 to 25.0% by weight.

12. The wear-resistant copper-based alloy according to claim 8, wherein said Fe is present in an amount of from 3.0 to 10.0% by weight.

13. The wear-resistant copper-based alloy according to claim 8, wherein said Co is present in an amount of from 2.0 to 10.0% by weight.

14. The wear-resistant copper-based alloy according to claim 8, wherein said Si is present in an amount of from 0.5 to 3.5% by weight.

15. The wear-resistant copper-based alloy according to claim 8, wherein said Cr is present in an amount of from 1.0 to 5.0% by weight.

16. The wear-resistant copper-based alloy according to claim 8, wherein said first optional element is present in an amount of from 2.0 to 10.0% by weight.

17. The wear-resistant copper based alloy according to claim 8, wherein the alloy contains Al, P, S, Sn, Zn, Bi, Sb and Mg in a total amount of up to 0.5 weight %.

18. A wear-resistant copper-based alloy useful for a surface building-up operation, consisting essentially of:

nickel (Ni) in an amount of from 10.0 to 30.0% by weight;

iron (Fe) in an amount of from 2.0 to 15.0% by weight;

cobalt (Co) in an amount of from 2.0 to 15.0% by weight;

silicon (Si) in an amount of from 0.5 to 5.0% by weight;

chromium (Cr) in an amount of from 1.0 to 10.0% by weight;

at least one first optional element selected from the group consisting of molybdenum (Mo), titanium (Ti), zirconium (Zr), niobium (Nb) and vanadium (V) in an amount of from 2.0 to 15.0% by weight;

the balance of copper (Cu) and inevitable impurities;

wherein lead (Pb), one of said inevitable impurities, is restricted to an amount of 0.02% by weight or less and amounts of carbon (C) and oxygen (O) are each greater than zero, the carbon and oxygen being effective to inhibit welding bead cracking during build-up of said alloy.

19. The wear-resistant copper-based alloy according to claim 18, wherein at least one optional element selected from the group consisting of yttrium (Y), misch metal, and hafnium (Hf) is present in an amount of from 0.01 to 0.1% by weight.

20. The wear-resistant copper-based alloy according to claim 18, wherein said Fe is present in an amount of from 3.0 to 10.0% by weight.

21. The wear-resistant copper-based alloy according to claim 18, wherein said Co is present in an amount of from 2.0 to 10.0% by weight.

22. The wear-resistant copper-based alloy according to claim 18, wherein said Si is present in an amount of from 0.3 to 3.5% by weight.

23. The wear-resistant copper-based alloy according to claim 18, wherein said Cr is present in an amount of from 1.0 to 5.0% by weight.

24. The wear-resistant copper-based alloy according to claim 18, wherein said first optional element is present in an amount of from 2.0 to 10.0% by weight.

25. The wear-resistant copper based alloy according to claim 18, wherein the alloy includes an amount of carbon (C) and oxygen (O) effective to inhibit welding bead cracking during build-up of said alloy, the oxygen being also present in an amount effective to form a protective oxide layer on an exposed surface of the alloy.

26. The wear-resistant copper based alloy according to claim 18, wherein the alloy includes oxygen in an amount sufficient to form a $SiO_2$ layer and the alloy includes 0.05 to 0.5 weight % carbon.

27. The wear-resistant copper based alloy according to claim 18, wherein the alloy comprises an α-phase matrix containing carbide and silicide precipitates uniformly dispersed in the matrix.

28. The wear-resistant copper-based alloy according to claim 18, wherein said inevitable impurities, aluminum (Al), phosphorus (P), sulfur (S), tin (Sn), zinc (Zn), bismuth (Bi), antimony (Sb), and magnesium (Mg), are present in a total amount of 0.05% by weight or less.

* * * * *